US012608371B1

(12) United States Patent
Rabito et al.

(10) Patent No.: US 12,608,371 B1
(45) Date of Patent: Apr. 21, 2026

(54) CHATBOT USING RETRIEVAL-AUGMENTED GENERATION

(71) Applicant: CVS PHARMACY, INC., Woonsocket, RI (US)

(72) Inventors: Matt Rabito, Scarsdale, NY (US); Yunshen Chen, Lexington, MA (US); Chenguang Peng, Jersey City, NJ (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

(21) Appl. No.: 18/983,905

(22) Filed: Dec. 17, 2024

(51) Int. Cl.
| | |
|---|---|
| *G06F 16/242* | (2019.01) |
| *G06F 16/22* | (2019.01) |
| *G06F 16/2452* | (2019.01) |

(52) U.S. Cl.
CPC ........ *G06F 16/243* (2019.01); *G06F 16/2237* (2019.01); *G06F 16/2452* (2019.01)

(58) Field of Classification Search
CPC . G06F 16/243; G06F 16/2237; G06F 16/2452
USPC ....................................................... 707/765
See application file for complete search history.

(56) References Cited

U.S. PATENT DOCUMENTS

| | | | | |
|---|---|---|---|---|
| 8,874,616 | B1 * | 10/2014 | Coffman | ................ G06Q 50/01 |
| | | | | 707/798 |
| 10,757,044 | B2 | 8/2020 | Fawcett | |
| 10,824,658 | B2 | 11/2020 | Bakis et al. | |
| 10,848,443 | B2 | 11/2020 | Helmy | |
| 11,100,524 | B1 | 8/2021 | Ross et al. | |
| 11,113,475 | B2 | 9/2021 | Sampat et al. | |
| 11,514,330 | B2 | 11/2022 | Ma et al. | |
| 11,516,158 | B1 | 11/2022 | Luzhnica et al. | |
| 11,709,873 | B2 | 7/2023 | Xiao et al. | |
| 11,710,479 | B1 | 7/2023 | Shenoy et al. | |
| 11,748,414 | B2 | 9/2023 | Mohanty et al. | |
| 11,997,057 | B2 | 5/2024 | Annadata et al. | |
| 12,010,073 | B2 | 6/2024 | Magliozzi et al. | |
| 2020/0097494 | A1 * | 3/2020 | Vertsel | ................... G06N 5/048 |
| 2021/0217408 | A1 | 7/2021 | Hakkani-Tur et al. | |
| 2023/0170069 | A1 | 6/2023 | Groteke et al. | |
| 2024/0046108 | A1 | 2/2024 | Ma et al. | |
| 2024/0256678 | A1 * | 8/2024 | Thompson | ............ H04L 9/3213 |
| 2025/0045256 | A1 * | 2/2025 | Gottlob | ................. G06F 16/211 |
| 2025/0131037 | A1 * | 4/2025 | Gunawardana | ..... G06F 16/9024 |
| 2025/0175219 | A1 * | 5/2025 | Elshafie | ................ H04L 5/0091 |

(Continued)

*Primary Examiner* — Kuen S Lu

(74) *Attorney, Agent, or Firm* — Foley & Lardner LLP

(57) ABSTRACT

A system can include one or more memory devices that can store instructions thereon that, when executed by one or more processors, cause the one or more processors to receive a natural language query for information associated with a first entity, generate a vector embedding based on the natural language query, search a vector database having a plurality of vector embeddings to identify a set of vector embeddings of the plurality of vector embeddings that are associated with the vector embedding, identify metadata that corresponds to respective vector embeddings of the set of vector embeddings, select a first vector embedding that corresponds to the first entity, generate a prompt based on the natural language query, generate a response to the natural language query using a machine learning model, and provide an electronic message that includes the response to the natural language query.

20 Claims, 13 Drawing Sheets

(56) References Cited

U.S. PATENT DOCUMENTS

2025/0225190 A1\*   7/2025   Varshney  ............ G06F 16/9532
2025/0238470 A1\*   7/2025   Penta  .................... G06F 16/907

\* cited by examiner

100

```
┌──────────────────────────────────────────────────────┐
│              Response System                          │
│                    105                                │
│   ┌──────────────────────────────────────────────┐   │
│   │          Processing Circuit                   │   │
│   │                110                            │   │
│   │   ┌──────────────┐    ┌──────────────────┐    │   │
│   │   │              │    │  Memory          │    │   │
│   │   │  Processor   │    │  120             │    │   │
│   │   │    115       │    │  ┌────────────┐  │    │   │
│   │   │              │    │  │ ML         │  │    │   │
│   │   │              │    │  │ Model      │  │    │   │
│   │   │              │    │  │ 122        │  │    │   │
│   │   └──────────────┘    │  └────────────┘  │    │   │
│   │                       └──────────────────┘    │   │
│   └──────────────────────────────────────────────┘   │
│                                                       │
│                ┌──────────────┐                       │
│                │  Interface   │                       │
│                │    145       │                       │
│                └──────────────┘                       │
└──────────────────────────────────────────────────────┘
```

Database 155
Embedding(s) 160

Network 150

User Device 165

Data Source(s) 170

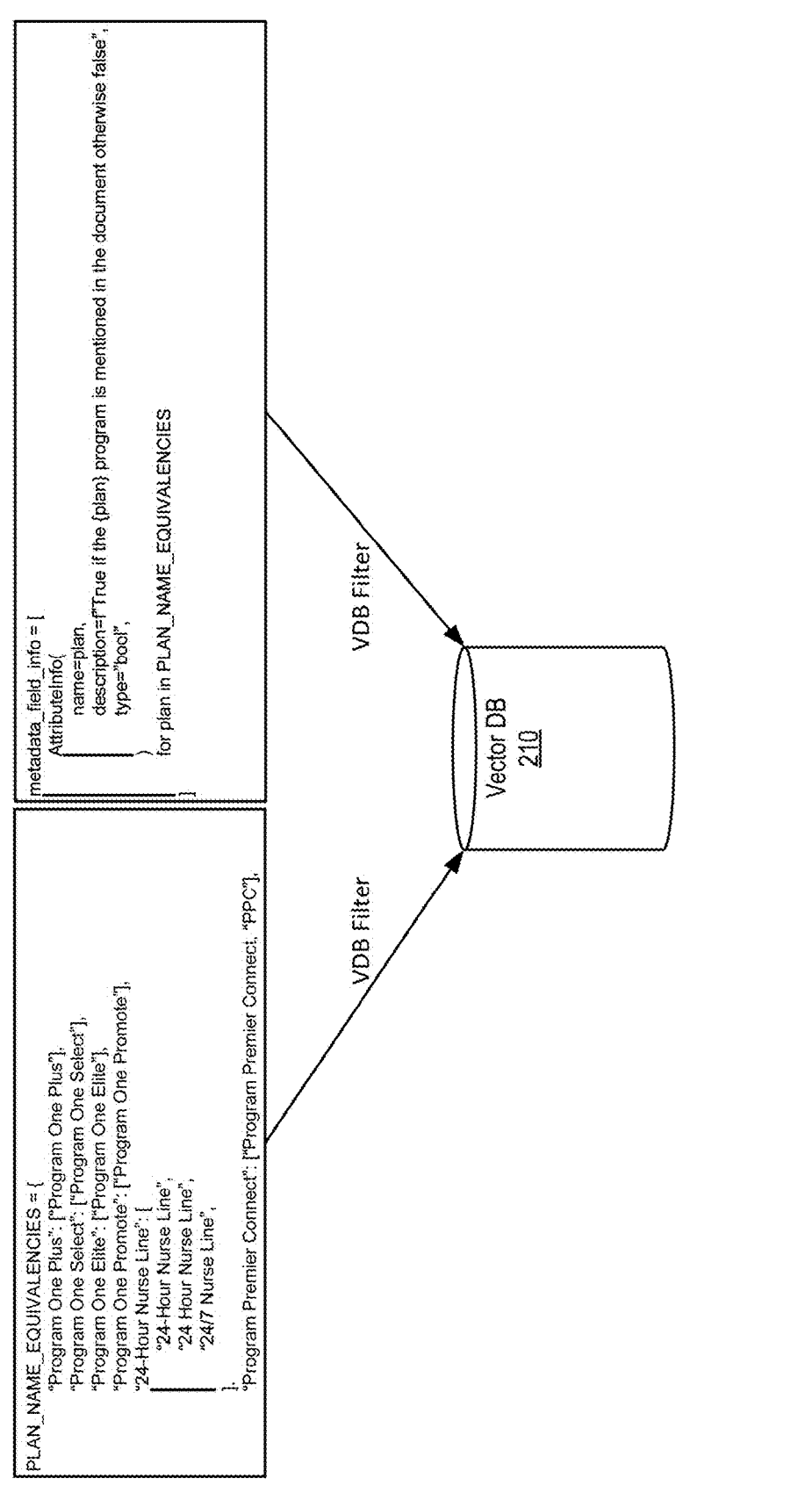

```
PLAN_NAME_EQUIVALENCIES = {
    "Program One Plus": ["Program One Plus"],
    "Program One Select": ["Program One Select"],
    "Program One Elite": ["Program One Elite"],
    "Program One Promote": ["Program One Promote"],
    "24-Hour Nurse Line": [
        "24-Hour Nurse Line",
        "24 Hour Nurse Line",
        "24/7 Nurse Line",
        ...],
    "Program Premier Connect": ["Program Premier Connect, "PPC"],
}
```

```
metadata_field_info = [
    AttributeInfo(
        name=plan,
        description="True if the {plan} program is mentioned in the document otherwise false",
        type="bool",
    )
    for plan in PLAN_NAME_EQUIVALENCIES
]
```

VDB Filter

VDB Filter

Vector DB
210

Data Source
170a

Data Source
170b

Data Source
170c

905

Refresh Script — 910

Re-embedding — 915

Clock — 920

Vector DB
Update — 925

1200

1300

1305
Normalized score below threshold

No → 1310 No action

Yes

Yes

1315
Is context relevant score low

No

Yes

1320
Is context used

No → 1330 Improve query handler

Yes

1325 Improve context retrieval

1335
Is context consistent

No → 1340 Model hallucination(s)

Yes → 1345 Update Q & A

CHATBOT USING RETRIEVAL-AUGMENTED GENERATION

BACKGROUND

Publicly accessible information may be accessible from one or more sources.

SUMMARY

At least one example relates to a system. The system can include one or more memory devices. The one or more memory devices can store instructions thereon. The instructions can, when executed by one or more processors, cause the one or more processors to receive, from a first computing device, a natural language query for information associated with a first entity. The instructions can cause the one or more processors to generate a vector embedding based on the natural language query. The instructions can cause the one or more processors to search, responsive to generation of the vector embedding, a vector database having a plurality of vector embeddings to identify a set of vector embeddings of the plurality of vector embeddings that are associated with the vector embedding. Each vector embedding of the set of vector embeddings can correspond to a respective entity of a plurality of entities. The instructions can cause the one or more processors to identify metadata that corresponds to respective vector embeddings of the set of vector embeddings. The instructions can cause the one or more processors to select, based on the metadata for each vector embedding of the set of vector embeddings, a first vector embedding that corresponds to the first entity. The instructions can cause the one or more processors to generate a prompt based on the natural language query using context provided using the first vector embedding. The instructions can cause the one or more processors to generate, by providing the prompt to a machine learning model, a response to the natural language query. The instructions can cause the one or more processors to provide, to the first computing device, an electronic message that includes the response to the natural language query.

In some examples, the first vector embedding can correspond to the first entity. A second vector embedding of the set of vector embeddings can correspond to a given entity of the plurality of entities. The instructions can cause the one or more processors to detect, responsive to identification of the set of vector embeddings, that a distance between the first vector embedding and the second vector embedding is less than a predetermined threshold. The instructions can cause the one or more processors to search, responsive to detection that the distance is less than the predetermined threshold, the vector database for (1) the metadata for the first vector embedding and (2) the metadata for the second vector embedding. The instructions can cause the one or more processors to differentiate, using the metadata for the first vector embedding and the metadata for the second vector embedding, the first entity from the given entity.

In some examples, the instructions can cause the one or more processors to retrieve, from a plurality of data sources, one or more sets of information associated with the plurality of entities. The instructions can cause the one or more processors to generate, responsive to retrieval of the one or more sets of information, the plurality of vector embeddings. The instructions can cause the one or more processors to ingest the plurality of vector embeddings into the vector database.

In some examples, generation of the plurality of vector embeddings can include the instructions causing the one or more processors to split the one or more sets of information into a plurality of segments, identify contents of each segment of the plurality of segments, and apply, based on a match between the contents of a segment of the plurality of segments and the metadata for the first vector embedding, a first tag to the first vector embedding.

In some examples, one or more tags can identify a set of characters or a data string to distinguish the first vector embedding from one or more second vector embeddings of the set of vector embeddings.

In some examples, the first entity can include a first identifier and a second identifier. The vector database can include information indicative of the first identifier. The natural language query can include one or more characters associated with the second identifier. The instructions can cause the one or more processors to detect, responsive to identification of the one or more characters, that the vector database includes second metadata to indicate a link between the second identifier and the first identifier. The instructions can cause the one or more processors to modify, responsive to detection of the second metadata, the natural language query to replace the one or more characters with one or more second characters associated with the first identifier. The instructions can cause the one or more processors to generate, using the natural language query including the one or more second characters, the vector embedding.

In some examples, the instructions can cause the one or more processors to receive, from a second computing device, a data structure that includes a plurality of mappings between respective identifiers of a plurality of identifiers. Each identifier of the plurality of identifiers can be associated with a respective entity of the plurality of entities. A first mapping of the plurality of mappings can indicate that (1) a first identifier of the plurality of identifiers corresponds to the first entity and (2) one or more second identifiers of the plurality of identifiers represent the first identifier. The instructions can cause the one or more processors to determine, responsive to receipt of the natural language query, that the natural language query includes the one or more second identifiers. The instructions can cause the one or more processors to detect, based on the first mapping, that the one or more second identifiers represent the first identifier. The instructions can cause the one or more processors to modify the natural language query to replace the one or more second identifiers with the first identifier.

In some examples, the instructions can cause the one or more processors to determine that the natural language query includes one or more characters indicative of a first node of a plurality of nodes within a hierarchical graph. The first node can be connected to one or more second nodes of the plurality of nodes. The first node can be representative of the first entity. The instructions can cause the one or more processors to retrieve, from one or more data sources, one or more sets of information associated with one or more second entities of the plurality of entities that are represented by the one or more second nodes. The instructions can cause the one or more processors to search the vector database using the one or more sets of information.

In some examples, each node of the plurality of nodes can represent a respective entity of the plurality of entities. The hierarchical graph can include (1) a top level having the first node and (2) a bottom level having the one or more second nodes. A connection between the first node and the one or more second nodes can indicate a hierarchical relationship between the first entity and the one or more second entities.

In some examples, the instructions can cause the one or more processors to retrieve, from each data source of a plurality of data sources, one or more sets of information associated with the plurality of entities. The instructions can cause the one or more processors to detect a conflict between a first portion of the one or more sets of information retrieved from a first data source of the plurality of data sources and a second portion of the one or more sets of information retrieved from a second data source of the plurality of data sources. The instructions can cause the one or more processors to determine, responsive to detection of the conflict, a first ranking for the first data source and a second ranking for the second data source. The instructions can cause the one or more processors to compare the first ranking for the first data source and the second ranking for the second data source. The instructions can cause the one or more processors to utilize, responsive to comparison of the first ranking and the second ranking, the first portion to identify the set of vector embeddings.

In some examples, the instructions can cause the one or more processors to transmit, to one or more data sources, one or more application programming interface (API) calls to retrieve one or more data structures that represent information associated with one or more entities of the plurality of entities. The instructions can cause the one or more processors to compare, responsive to retrieval of the one or more data structures, metadata associated with the one or more data structures with metadata associated with one or more vector embeddings of the plurality of vector embeddings that correspond to the one or more entities. The instructions can cause the one or more processors to detect one or more differences between the one or more data structures and the one or more vector embeddings. The instructions can cause the one or more processors to update, responsive to detection of the one or more differences, the vector database to replace the one or more vector embeddings with one or more second vector embeddings that correspond to the one or more data structures.

In some examples, the instructions can cause the one or more processors to receive, responsive to generation of the response, one or more second responses that accurately address the natural language query. The instructions can cause the one or more processors to execute, responsive to receipt of the one or more second responses, a second machine learning model to evaluate the response based on information associated with the one or more second responses. The instructions can cause the one or more processors to determine, responsive to execution of the second machine learning model, a performance of the machine learning model with respect to generation of the response.

At least one example relates to a method. The method can include receiving, by one or more processing circuits, from a first computing device, a natural language query for information associated with a first entity. The method can include generating, by the one or more processing circuits, a vector embedding based on the natural language query. The method can include searching, by the one or more processing circuits, responsive to generating the vector embedding, a vector database having a plurality of vector embeddings to identify a set of vector embeddings of the plurality of vector embeddings that are associated with the vector embedding. Each vector embedding of the set of vector embeddings can correspond to a respective entity of a plurality of entities. The method can include identifying, by the one or more processing circuits, metadata that corresponds to respective vector embeddings of the set of vector embeddings. The method can include selecting, by the one or more processing circuits, based on the metadata for each vector embedding of the set of vector embeddings, a first vector embedding that corresponds to the first entity. The method can include generating, by the one or more processing circuits, an input based on the natural language query using context provided using the first vector embedding. The method can include generating, by the one or more processing circuits, by providing the input to a machine learning model, a response to the natural language query. The method can include providing, by the one or more processing circuits, to the first computing device, an electronic message that includes the response to the natural language query.

In some examples, the first vector embedding can correspond to the first entity. A second vector embedding of the set of vector embeddings can correspond to a given entity of the plurality of entities. The method can include detecting, by the one or more processing circuits, responsive to identifying the set of vector embeddings, that a distance between the first vector embedding and the second vector embedding is less than a predetermined threshold. The method can include searching, by the one or more processing circuits, responsive to detecting that the distance is less than the predetermined threshold, the vector database for (1) the metadata for the first vector embedding and (2) the metadata for the second vector embedding. The method can include differentiating, by the one or more processing circuits, using the metadata for the first vector embedding and the metadata for the second vector embedding, the first entity from the given entity.

In some examples, the method can include retrieving, by the one or more processing circuits, from a plurality of data sources, one or more sets of information associated with the plurality of entities. The method can include generating, by the one or more processing circuits, responsive to retrieving the one or more sets of information, the plurality of vector embeddings. The method can include ingesting, by the one or more processing circuits, the plurality of vector embeddings into the vector database.

In some examples, the first entity can include a first identifier and a second identifier. The vector database can include information indicative of the first identifier. The natural language query can include one or more characters associated with the second identifier. The method can include detecting, by the one or more processing circuits, responsive to identifying the one or more characters, that the vector database includes second metadata to indicate a link between the second identifier and the first identifier. The method can include modifying, by the one or more processing circuits, responsive to detecting the second metadata, the natural language query to replace the one or more characters with one or more second characters associated with the first identifier. The method can include generating, by the one or more processing circuits, using the natural language query including the one or more second characters, the vector embedding.

In some examples, the method can include receiving, by the one or more processing circuits, from a second computing device, a data structure that includes a plurality of mappings between respective identifiers of a plurality of identifiers. Each identifier of the plurality of identifiers can be associated with a respective entity of the plurality of entities. A first mapping of the plurality of mappings can indicate that (1) a first identifier of the plurality of identifiers corresponds to the first entity and (2) one or more second identifiers of the plurality of identifiers represent the first identifier. The method can include determining, by the one or more processing circuits, responsive to receiving the natural language query, that the natural language query includes the one or more second identifiers. The method can include detecting, by the one or more processing circuits, based on the first mapping, that the one or more second identifiers represent the first identifier. The method can include modifying, by the one or more processing circuits, the natural language query to replace the one or more second identifiers with the first identifier.

At least one example relates to one or more non-transitory storage media. The one or more non-transitory storage media can store instructions thereon. The instructions can, when executed by one or more processors, cause the one or more processors to perform operations. The operations can include receiving, from a first computing device, a natural language query for information associated with a first entity. The operations can include generating a vector embedding based on the natural language query. The operations can include searching, responsive to generating the vector embedding, a vector database having a plurality of vector embeddings to identify a set of vector embeddings of the plurality of vector embeddings that are associated with the vector embedding. Each vector embedding of the set of vector embeddings can correspond to a respective entity of a plurality of entities. The operations can include identifying metadata that corresponds to respective vector embeddings of the set of vector embeddings. The operations can include selecting, based on the metadata for each vector embedding of the set of vector embeddings, a first vector embedding that corresponds to the first entity. The operations can include generating a prompt based on the natural language query using context provided using the first vector embedding. The operations can include generating, by providing the prompt to a large language model, a response to the natural language query. The operations can include providing, to the first computing device, an electronic message that includes the response to the natural language query.

In some examples, the first vector embedding can correspond to the first entity. A second vector embedding of the set of vector embeddings can correspond to a given entity of the plurality of entities. The operations can include detecting, responsive to identifying the set of vector embeddings, that a distance between the first vector embedding and the second vector embedding is less than a predetermined threshold. The operations can include searching, responsive to detecting that the distance is less than the predetermined threshold, the vector database for (1) the metadata for the first vector embedding and (2) the metadata for the second vector embedding. The operations can include differentiating, using the metadata for the first vector embedding and the metadata for the second vector embedding, the first entity from the given entity.

In some examples, the operations can include retrieving, from a plurality of data sources, one or more sets of information associated with the plurality of entities. The operations can include generating, responsive to retrieving the one or more sets of information, the plurality of vector embeddings. The operations can include ingesting the plurality of vector embeddings into the vector database.

All examples and features mentioned herein may be combined in any technically possible way.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1 is a block diagram of a system to generate responses to one or more inputs, according to some examples.

FIG. 5 is a workflow illustrating identification of metadata tags for vector embedding retrieval, according to some examples.

DETAILED DESCRIPTION

Figure 2:
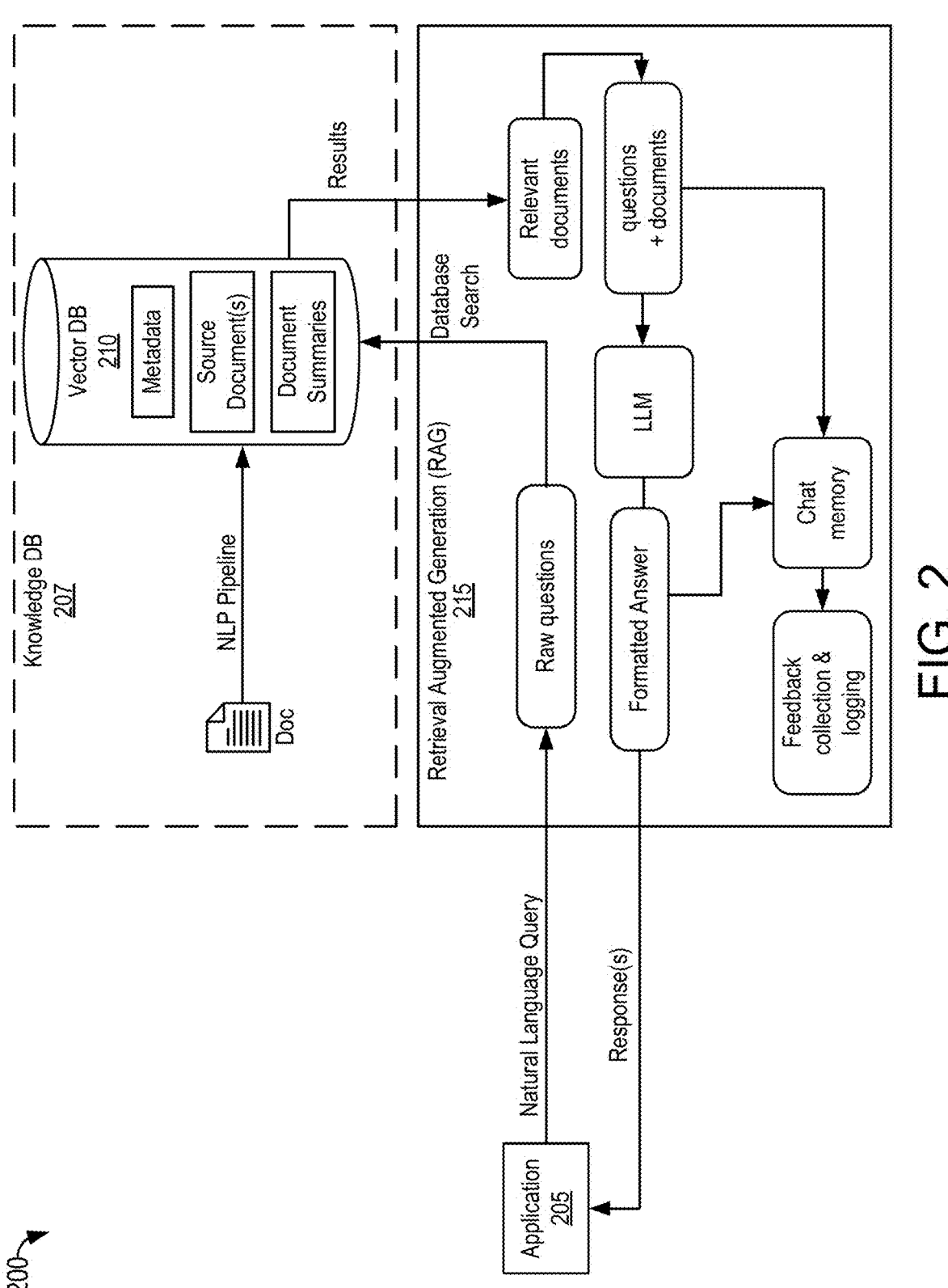
FIG. 2 is a workflow illustrating pre-processing one or more inputs from a computing device, according to some examples.

Referring generally to the FIGURES, systems and methods for response generation is described herein. Response generation may refer to and/or include generating outputs and/or messages that address or otherwise pertain to one or more natural language queries. For example, response generation may include executing a retrieval augmented generation process to obtain information from a database. The obtained information may be used by a machine learning model, such as a large language model (LLM), to generate a response to the natural language queries (e.g., by utilizing the context from the information together with the natural language query to generate a prompt for the machine learning model). Moreover, the retrieval augmented generation process may include detection of metadata for which one or more pieces of information may be discernable from one another. The retrieval augmented generation process may implement or otherwise utilize vector embeddings that represent one or more sets of information.

Vector embeddings may refer to or include numerical representations of textual information such as words, sentences, phrases, expressions, and/or images. For example, a vector embedding may include an array or data structure that represents given textual information. Machine learning models (e.g., pre-trained transformers, large language models, neural networks, regression trees, artificial intelligence models, etc.) can use vector embeddings to generate responses and/or outputs. For example, machine learning models can use vector embeddings to implement or otherwise execute natural language processing (NLP).

Vector embeddings may be generated using publicly accessible information (e.g., websites, online forums, social media, blogs, etc.), in some implementations. For example, information may be pulled or retrieved from a website via one or more application programming interface (API) calls. Vector embeddings can be modified or arranged based on one or more domains. For example, vector embeddings can be constructed based on semantic patterns that corresponds to one or more fields. The fields may refer to or include an area of implementation (e.g., a setting, a context, etc.) for which the vector embeddings may be utilized. For example, medical imaging would represent a field. As another example, prescription medication would represent a field. In some implementations, the vector embeddings may additionally or alternatively be generated using information that is not publicly accessible.

Domain-specific vector embeddings can help improve the accuracy of machine learning models in that the vector embeddings are constructed according to implementation. However, textual information (e.g., names, phrases, expressions, etc.) for a first product may include overlap (e.g., similar information) to a second product. As a result, even though the first product and the second product are different, a vector embedding for the first product may be undiscernible or undistinguishable from a vector embedding for the second product. Accordingly, when a machine learning model is generating responses based on queries regarding the first product or the second product, the machine learning model may be unable to identify an intended vector embedding. Additionally, and/or alternatively, a machine learning model may be unable to discern an underlying difference in semantics based on a vector embedding alone.

While entities (e.g., companies, distributors, providers, manufacturers, etc.) often publish, produce, or otherwise provide accessible information (e.g., online resources, websites, social media posts, literature, etc.), the published information often includes formal names, official names, or otherwise proper nomenclature. Stated otherwise, the published information typically does not include product nicknames, popular names, product acronyms, friendly names, common names, or colloquial names. As a result, machine learning models may struggle to properly respond to natural language queries that include phrasing (even though accurate) that is absent from the published information. The machine learning models may receive natural language queries with misspellings or incorrect terminology which may also cause the machine learning models to struggle in discerning vector embeddings from one another.

Products often include groupings (e.g., sub-products, sub-programs, etc.) having hierarchical relationships. For example, a first product may include one or more sub-products that depend from the first product. Stated otherwise, the first product may include one or more child nodes. Hierarchical relationships are often associated with varying authorization or eligibility requirements. For example, a first node of a tree may be associated with a first set of access codes. In this example, the first node may be accessible to entities indicated as having the first set of access codes. As an example, a first product may include criteria or metrics that dictate offerings to one or more users. Stated otherwise, a first product may only be accessible to users that have selected or otherwise chosen the first product. Accordingly, without a context or understanding of hierarchical relationships, the machine learning models may be unable to discern vector embeddings that represent different nodes or levels of the hierarchical relationships.

Publicly accessible information can be provided by or otherwise accessible from one or more data sources. For example, information associated with a product or an offering, may be accessible from a first source and a second source. In this example, the first source may represent or refer to a primary source and the second source may refer to a secondary source. Vector embeddings may be generated or otherwise updated with information from conflicting sources. For example, information that corresponds to a first product may be retrieved from multiple data sources. If the data sources include conflicting or inconsistent information, a vector database may be constructed with vector embeddings that contradict one another. As a result, the machine learning models may select or otherwise utilize vector embeddings that are incorrect, inconsistent, or incomplete.

Chatbots can improve or enhance user experiences with respect to natural language queries. However, machine learning model generated responses may be prone to hallucinations or inaccuracies that can decrease the user experiences. As a result, a response may include incorrect or inaccurate information. Incorrect responses may impact a truthfulness of chatbot responses which can impact a user experience with the chatbot. Evaluating or determining a performance (e.g., accuracy, consistency, tone, etc.) of a chatbot with respect to generating responses to natural language queries is also prone to errors as it is often difficult to establish when and/or how often a performance of a given model should be tested.

The present disclosure describes various technical solutions that may overcome the aforementioned limitations of domain-specific embeddings. For example, one or more metadata tags may be ingested into and/or otherwise added to one or more databases. The metadata tags can indicate and/or otherwise identify supplemental information to distinguish vector embeddings from one another. For example, a first metadata tag may be added to a vector database. The first metadata tag may be paired or otherwise associated with one or more vector embeddings. During retrieval and/or querying of the vector database, the first metadata tag may be detected. A machine learning model may utilize the first metadata tag to detect that one or more portions and/or characters of a natural language query correspond to the vector embeddings paired with the first metadata tag. Stated otherwise, the metadata tags can serve as lookups and/or keys for which a machine learning model may be able to discern vector embeddings from one another. As an example, the metadata tags may represent a given product name or program offering. The metadata tags may be used, by a machine learning model, to filter results of a search to vector embeddings that correspond to the metadata tags.

The present disclosure further describes technical solutions to overcome the aforementioned limitations regarding documentation having official names versus popular names. For example, a chart or other table having one or more mappings between official names and popular names may be ingested into or otherwise added into one or more databases. If a natural language query were to include a popular name, the mappings may identify a corresponding official name. Advantageously, vector embeddings of the natural language query may replace or supplement the popular name with the corresponding official name. As a result, vector embeddings, that correspond to the official name, may be discovered, or otherwise identified within the vector database. Vector embeddings alone may be unable to solve and/or address cases where two or more terms or phrases are distinct in a specific domain which is outside of the pre-training of a model (e.g., out-of-sample inference). Stated otherwise, in instances where a desired program and/or product name is outside of (e.g., absent, not included, etc.) training data that used to train a model (e.g., pre-trained model), vector embeddings may not provide enough context.

The present disclosure further describes technical solutions to overcome the aforementioned limitations regarding domains having one or more hierarchical relationships. For example, one or more program mappings or trees may be provided to machine learning models such that the machine learning models may detect one or more mentioned products include sub-programs and/or represent sub-programs. When natural language queries recite or otherwise indicate products or programs that have a hierarchical relationship, the machine learning models may walk or otherwise navigate the tree to improve representations of product or program relationships.

The present disclosure further describes technical solutions to overcome the aforementioned limitations regarding data sources or underlying documentation having conflicting or inconsistent information. For example, data sources may be ranked or otherwise scored such that documentation may be selected and/or retrieved from data sources having higher rankings or scores. Stated otherwise, documentation may first be pulled from trustworthy data sources. Additionally, or alternatively, documentation may be pulled from multiple data sources and then each document or information may be ranked according to an underlying data source for which the information was pulled.

The present disclosure further describes technical solutions to overcome the aforementioned limitations regarding evaluation of machine learning model generated responses. For example, machine learning generated responses may be compared with one or more human generated responses. The machine learning generated responses and the human generated responses may correspond to the same natural language query. The performance of the machine learning model may be based on similarities and/or differences between the machine learning generated responses and the human generated responses.

FIG. 1 depicts a block diagram of system 100, according to some examples. In some examples, the system 100 and/or one or more components thereof may implement and/or include a closed-loop system. Each system and/or component of the system 100 can include one or more processors, memory, network interfaces, communication interfaces, and/or user interfaces. Memory can store programming logic that, when executed by the processors, controls the operation of the corresponding computing system or device. Memory can also store data in databases. The network interfaces can allow the systems and/or components of the system 100 to communicate wirelessly. The communication interfaces can include wired and/or wireless communication interfaces and the systems and/or components of the system 100 can be connected via the communication interfaces. The various components of the system 100 can be implemented via hardware (e.g., circuitry), software (e.g., executable code), or any combination thereof. Systems, devices, and components in FIG. 1 can be added, deleted, integrated, separated, and/or rearranged.

In some examples, the system 100 may include at least one response system 105, at least one network 150, at least one database 155, at least one user device 165, and/or at least one data source 170. In some examples, the system 100 and/or one or more systems, devices, and/or components thereof may implement at least one of the various techniques, processes, operations, and/or actions described herein to generate descriptions of products.

In some examples, the network 150 may include at least one of a local area network (LAN), a wide area network (WAN), a telephone network (such as the Public Switched Telephone Network (PSTN)), a Controller Area Network (CAN), a wireless link, an intranet, the Internet, a cellular network, and/or combinations thereof. In some examples, the various systems, components, and/or devices included in the system 100 may communicate with one another via the network 150.

In some examples, the user device 165 may perform various actions and/or access various types of information. The information may be provided over the network 150. In some examples, the user device 165 may perform similar functionality to that of at least one system, device, and/or component of the system 100. For example, the user device 165 may perform similar operations to that of the response system 105. In some examples, the user device 165 may include one or more applications to receive information, display information, and/or receive user interactions with content displayed by the user device 165. The user device 165 may provide one or more inputs (e.g., queries, utterances, natural language messages, etc.) to the response system 105.

In some examples, the user device 165 may include at least one of a screen, a monitor, a visual display device, a touchscreen display, a television, a video display, a liquid crystal display (LCD), a light emitting diode (LED) display, a mobile device, a kiosk, a digital terminal, a mobile computing device, a desktop computer, a smartphone, a tablet, a smart watch, a smart sensor, and/or any other device that can facilitate providing, receiving, displaying and/or otherwise interacting with content (e.g., webpages, mobile applications, etc.). For example, the user device 165 may include displays that include a resistive touchscreen that can receive user input via interactions (e.g., touches) with the touchscreen.

In some examples, the database 155 may include at least one of a computing device, a remote server, a server bank, a remote device, and/or among other possible computer hardware and/or computer software. For example, the database 155 may include a server bank and the server bank can store, keep, maintain, and/or otherwise hold the various types of information described herein. In some examples, the database 155 may house and/or otherwise implement at least one of the various systems, devices, and/or components described herein. In some examples, the database 155 may include, store, maintain, and/or otherwise host the response system 105. For example, the response system 105 may be distributed across one or more servers (e.g., the database 155). In some implementations, the response system 105 and/or various other components of the system 100 may be implemented using cloud computing services/platforms.

In some examples, the database 155 may store or otherwise maintain one or more sets of information. For example, the database 155 may store one or more sets of information provided from the data sources 170. As another example, the database 155 may store one or more outputs generated by or otherwise provided by the response system 105. In some examples, the database 155 may store one or more embeddings (shown as embeddings 160) and/or vector embeddings. For example, the database 155 may store embeddings that represent one or more sets of information. As another example, the database 155 may store vectors and/or other possible mathematical representations of information.

In some examples, the data sources 170 may refer to and/or include one or more types of data sources. For example, the data sources 170 may represent primary sources of information. As another example, the data sources 170 may represent secondary sources of information. In some examples, the data sources 170 may be associated with one or more entities. For example, a first data source 170 may be a website or other possible online resource. As another example, a second data source 170 may be a product specification or other possible publication. In some examples, the data sources 170 may provide and/or include information associated with and/or corresponding to at least one of products, programs, offerings, policies, geographical relationships, regulations, and/or resources. For example, the data source 170 may provide information from a web browser, a website, a Uniform Resource Locator (URL), product labels, product images, and/or other possible types of information.

In some examples, the data sources 170 may include at least one of online resources, publicly accessible information sources, Application Programming Interface (API) messages, data registries, and/or other possible sources. The data sources 170 may provide information associated with a description of a product listed on a website (e.g., an entity). As another example, the data sources 170 may provide information associated with a description of a program that is available from a provider (e.g., an entity). In some examples, the data sources 170 may provide information, such as published descriptions of products, product labels, user provided descriptions, product images, product type, and/or various types of information associated with products.

In some examples, the response system 105 may include at least one processing circuit 110 and/or at least one interface 145. The processing circuit 110 may include at least one processor 115 and memory 120. In some examples, the processing circuit 110 and/or one or more components thereof (e.g., the processors 115 and memory 120) may perform similar functionality to that of the response system 105 and/or one or more components thereof. For example, memory 120 may store programming logic that, when executed by the processors 115, causes the processors 115 to generate one or more responses to the user device 165.

In some examples, the processing circuit 110 may be communicably connected to one or more components of the response system 105. For example, the processing circuit 110 may be communicably connected to the interface 145. In some examples, the processors 115 may be implemented as a general-purpose processor, an application specific integrated circuit (ASIC), one or more field programmable gate arrays (FPGAs), a group of processing components, or other suitable electronic processing components.

In some examples, memory 120 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 120 may be or include volatile memory or non-volatile memory. Memory 120 may include database components, object code components, script components, or any other type of information structure for supporting the various activities and information structures described in the present application. According to an exemplary example, memory 120 is communicably connected to the processors 115 via the processing circuit

110 and memory 120 includes computer code for executing (e.g., by the processing circuit 110 and/or the processors 115) one or more processes described herein.

In some examples, memory 120 may store, keep, hold, and/or otherwise maintain at least one machine learning (ML) model 122. The ML model 122 may be trained using one or more various ML and/or Artificial Intelligence techniques. For example, the ML model 122 may be trained using supervised and/or unsupervised learning. As another example, the ML model 122 may be trained using deep learning techniques. In some examples, one or more components of the response system 105 may access and/or utilize the ML model 122. For example, the processors 115 may utilize the ML model 122. In some examples, the ML model 122 is trained to generate one or more responses to natural language queries.

In some examples, the ML model 122 may refer to and/or include Generative Artificial Intelligence (GAI). In some examples, the ML model 122 and/or various other models described herein may be or include a large language model (LLM). For example, the ML model 122 may include a generative pre-trained transformer. In some examples, the generative pre-trained transformer (e.g., the ML model 122) may generate one or more responses that were absent from training data used to train the ML model 122. For example, the generative pre-trained transformer may be trained to generate responses to natural language queries, instead of or in addition to retrieving and/or identifying responses that were included in training data. In some implementations, the ML model 122 may generate responses that do not exist within data sources (e.g., the database 155, the data sources 170, etc.) available to the ML model 122, regardless of whether the data was used to train the ML model 122 (e.g., may generate new, non-preexisting responses).

In some examples, the interface 145 may include at least one of network communication devices, network interfaces, and/or other possible communication interfaces. The interface 145 may include wired or wireless communications interfaces (e.g., jacks, antennas, transmitters, receivers, transceivers, wire terminals, etc.) for conducting data communications with various systems, devices, and/or components described herein. The interface 145 may be direct (e.g., local wired or wireless communications) and/or via a communications network (e.g., the network 150). For example, the interface 145 may include an Ethernet card and port for sending and receiving data via an Ethernet-based communications link or network. The interface 145 may also include a Wi-Fi transceiver for communicating via a wireless communications network (e.g., the network 150). The interface 145 may include a power line communications interface. The interface 145 may include an Ethernet interface, a USB interface, a serial communications interface, and/or a parallel communications interface.

In some examples, the response system 105 may generate, produce, provide, and/or otherwise display at least one user interface. For example, the response system 105 may display at least one Graphical User Interface. In some examples, the response system 105 may transmit one or more signals that cause one or more devices to display a user interface. For example, the interface 145 may transmit signals, to the user device 165, that cause the user device 165 to display a user interface.

In some examples, the processing circuits 110 may retrieve one or more sets of information. For example, the processing circuits may transmit one or more Application Programming Interface (API) calls to retrieve the information. In some examples, the processing circuits 110 may retrieve the information from a database. For example, the processing circuits 110 may retrieve information from the database 155. In some examples, the processing circuits may retrieve information that corresponds to at least one product and/or program. For example, the processing circuits 110 may retrieve information that corresponds to a pill container (e.g., a product). As another example, the processing circuits 110 may retrieve information that corresponds to an Over the Counter (OTC) medication (e.g., a product). In some examples, the information may refer to and/or include at least one of descriptions, synopses, summaries, representations, and/or offerings.

In some examples, at least one the various products, programs, offerings, and/or entities described herein may refer to and/or include one or more of wellness programs, health insurance plans, member support resources, prescription management services, customer service resources, and/or patient support programs. As an example, a first program may refer to and/or include a health insurance plan. The first program may include at least one of benefits, resources, and/or assistance. As another example, a program may refer to and/or include wellness programs such as, remote fitness consultations, membership offerings, remote services, and/or technology device reimbursements.

In some examples, the processing circuits 110 may perform data scraping on retrieved information. For example, the processing circuits 110 may perform Optical Character Recognition (OCR) on images of products (e.g., retrieved information). As another example, the processing circuits 110 may extract information from a label (e.g., an image of a product) to supplement the information that is provided to the ML model 122. In some examples, the processing circuits 110 may provide subsequent data (e.g., scraped data) to the ML model 122 to cause the ML model 122 to update and/or generate one or more responses.

In some examples, the processing circuits 110 may generate one or more embeddings. For example, the processing circuits 110 may execute a word2vec application to generate vector embeddings that represent one or more retrieved documents. As another example, the processing circuits 110 may execute a tokenization process to generate one or more tokens that represent information obtained from the data sources 170. In some examples, the processing circuits 110 may store the embeddings (e.g., embeddings 160) in the database 155 for subsequent retrieval and/or utilization.

In some examples, the embeddings 160 may refer to and/or include vector embeddings that represent one or more sets of information. For example, a first embedding 160 may represent a first product and/or a description of the product. As another example, a second embedding 160 may represent one or more chunks of information extracted from a document. In some examples, the embeddings 160 may be retrievable and/or queryable from within the database 155. For example, the embeddings 160 may be searched, by the processing circuits 110, using one or more database queries.

FIG. 2 depicts a workflow 200, according to some examples. In some examples, the workflow 200 may represent and/or illustrate one or more steps, actions, processes, and/or transmissions to receive, ingest, process, and/or otherwise accept one or more natural language queries. For example, the workflow 200 may represent one or more steps to generate and/or store the embeddings 160. As another example, the workflow 200 may represent one or more steps to detect matches and/or similarities between natural language queries and one or more vector embeddings. In some examples, the workflow 200 and/or one or more portions thereof may be executed by and/or carried out by the system

100 and/or one or more systems, devices, components, and/or elements thereof. For example, the processing circuits 110 may execute the workflow 200.

In some examples, the workflow 200 may include an application 205, a knowledge database (shown as knowledge DB 207), and a retrieval augmented generation (RAG) 215. The workflow 200 may represent a pipeline or architecture for which one or more responses, to natural language queries, may be generated. For example, as shown in FIG. 2, the application 205 may transmit one or more natural language queries to the RAG 215. The RAG 215 may provide one or more formatted answers (e.g., responses) to the application 205. In some examples, the application 205 may refer to and/or include at least one of a web browser, a chatbot interface, an application executed on and/or by the user device 165, and/or one or more sets of instructions that, when executed by a computing device, cause the computing device to implement the application 205.

As shown in FIG. 2, the knowledge DB 207 includes vector database (DB) 210 which includes one or more sets of information (e.g., metadata, source documents, document summaries, etc.) that were obtained from a natural language processing (NLP) pipeline. For example, the vector DB 210 may include one or more vector embeddings that represent one or more chunks and/or segments of documentation retrieved from the data sources 170. As another example, the vector DB 210 may include one or more tags and/or flags for which information may be retrieved.

In some examples, the RAG 215 may perform one or more database searches, using the raw questions and/or vector embeddings that represent the raw questions. For example, the RAG 215 may query the knowledge DB 207 to detect matches and/or similarities between the natural language queries and information stored in the knowledge DB 207. In some examples, the RAG 215 may return one or more results. For example, the RAG 215 may return one or more sets of information that correspond to and/or that are related to the raw questions. As another example, the RAG 215 may return one or more document summaries that match an underlying request of a query.

In some examples, the RAG 215 may execute and/or implement an LLM (e.g., the ML model 122) to generate one or more response to the raw questions. As shown in FIG. 2, the RAG 215 may provide the raw questions and the retrieved documents to the LLM. In some examples, the LLM may generate one or more outputs using the information inputted by the RAG 215. For example, the LLM may generate a response using the retrieved documents as one or more constraints. As shown in FIG. 2, the RAG 215 may provide and/or return one or more answers (e.g., responses) to the application 205. For example, the RAG 215 may provide one or more sets of information that addresses the raw questions. As another example, the RAG 215 may direct the application 205 to a web page or other possible online resource.

In some examples, the RAG 215 may utilize a context of retrieved documents (e.g., documents from the vector DB 210) and the raw questions to generate one or more prompts. For example, the RAG 215 may utilize the context to generate a prompt for the LLM. As another example, the RAG 215 may provide information (e.g., the context) as a prompt which relays a meaning behind the raw question. As even another example, the RAG 215 may utilize the context to distinguish and/or differentiate potential responses and/or outputs of the LLM.

In some examples, the RAG 215 may store the responses (generated by the LLM) as chat memory and/or history. The chat memory may be forwarded and/or logged for feedback collection and/or evaluation. For example, the RAG 215 may maintain the chat memory for subsequent performance review. Stated otherwise, the chat memory may be utilized to determine a performance of the LLM and/or RAG 215 in generating the responses to the natural language queries.

Figure 3:
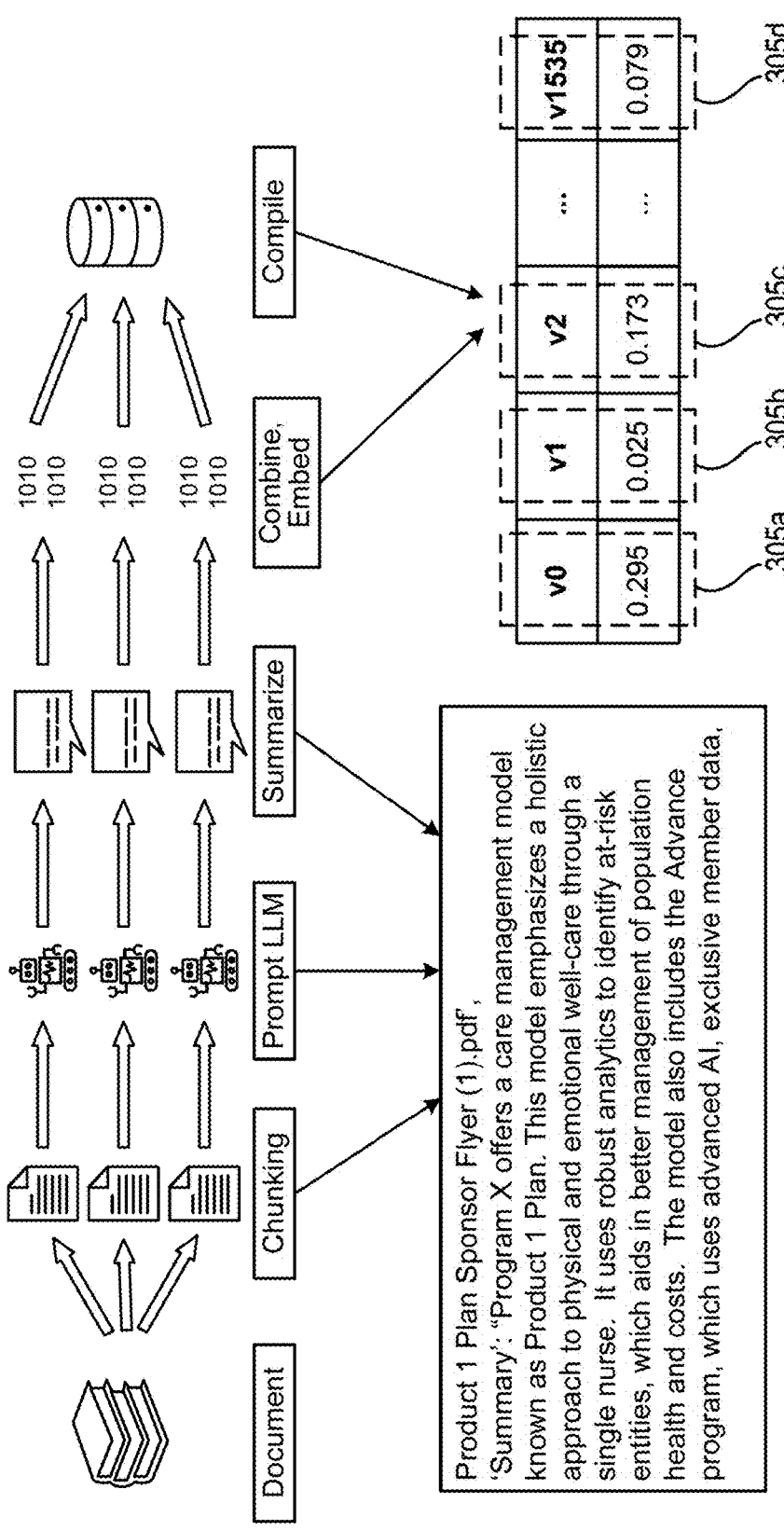
FIG. 3 is a workflow illustrating generation of vector embeddings for storage in a vector database, according to some examples.

FIG. 3 depicts a workflow 300, according to some examples. In some examples, the workflow 300 may represent one or more steps to generate or update a vector database. For example, the vector DB 210 may be generated responsive to execution of the workflow 300. As another example, the embeddings 160 may be generated responsive to execution of the workflow 300. In some examples, the system 100 and/or one or more components thereof may execute and/or implement the workflow 300. For example, the processing circuits 110 may execute the workflow 300.

In some examples, one or more vectors and/or vector embeddings (shown as vector 305a, vector 305b, vector 305c, vector 305d, etc.) may be generated responsive to execution of the workflow 300. For example, the vectors may be generated as a result of providing documentation and/or portions thereof to an LLM (e.g., the ML model 122). In some examples, the workflow 300 may include a retrieval of one or more sets of information. For example, the processing circuits 110 may retrieve one or more documents from the data sources 170.

In some examples, the one or more sets of information may be divided into segments and/or chunks. For example, a document may be divided into one or more portions. In some examples, the processing circuit 110 may execute a chunking function to divide the information into segments. In some examples, the processing circuit 110 may provide or otherwise input the chunks into an LLM. For example, the processing circuit 110 may provide the chunks as one or more inputs to the ML model 122. As another example, the processing circuit 110 may prompt the ML model 122 to generate one or more summaries of the segments.

In some examples, the ML model 122 may generate one or more summaries that describe or otherwise indicate information that pertains to the segments. For example, the ML model 122 may generate a brief summary that highlights what information is included in a given segment. As another example, the ML model 122 may generate an outline or summarization that provides an indication of information included in a given segment.

In some examples, the ML model 122 may generate one or more embeddings using the summaries. For example, the ML model 122 may generate a vector embedding for each summary. As another example, the ML model 122 may generate a single vector embedding that represents each segment for a given document. As another example, the ML model 122 may generate respective vector embeddings for each segment of a given document. In some examples, the ML model 122 may ingest or otherwise compile the vector embeddings within a database. For example, the ML model 122 may ingest the vectors 305 into the vector DB 210. As another example, the ML model 122 may store the vectors 305 (as embeddings 160) within the database 155.

Figure 4:
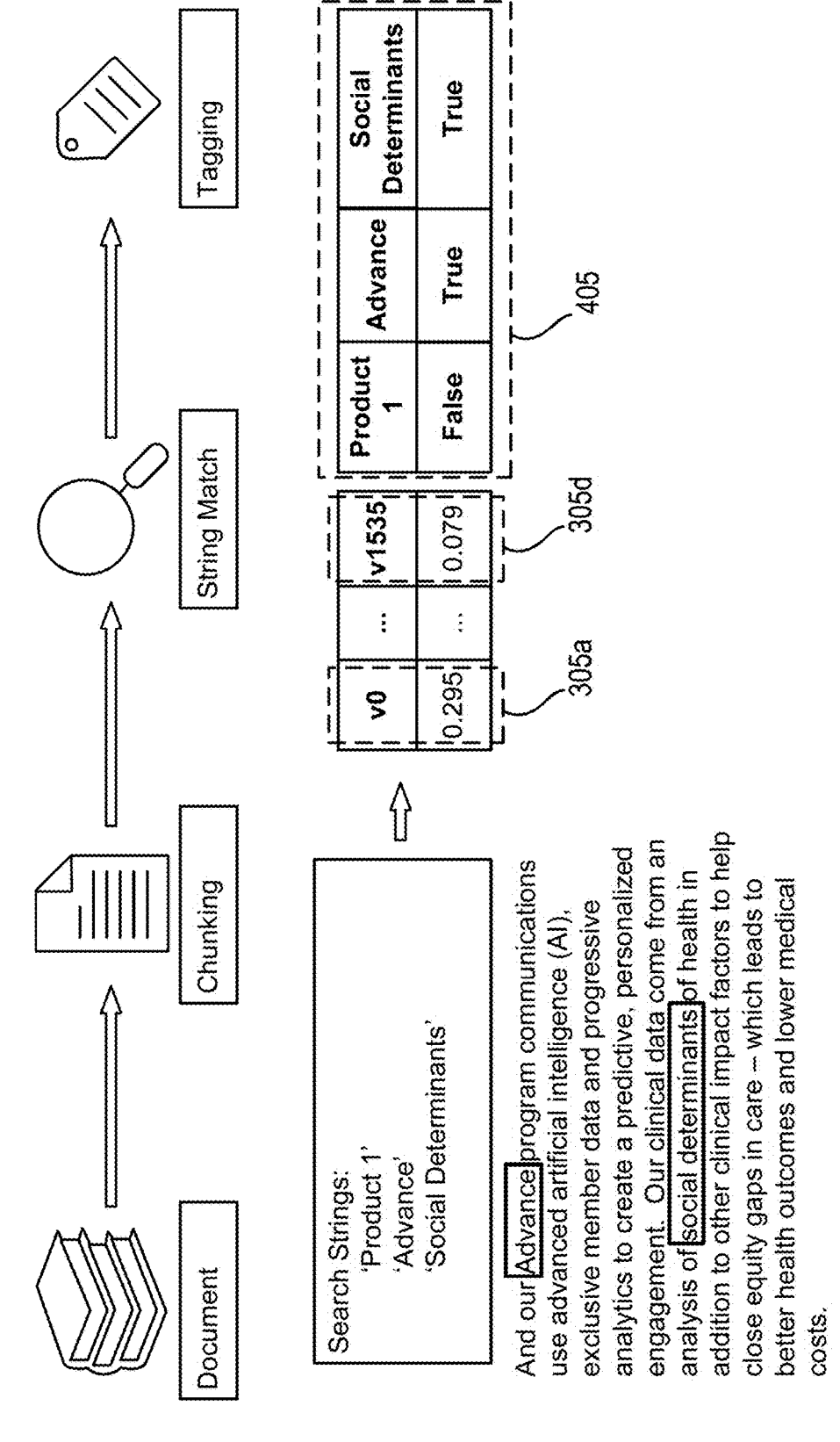
FIG. 4 is a workflow illustrating ingestion of metadata into a vector database, according to some examples.

FIG. 4 depicts a workflow 400, according to some examples. In some examples, the workflow 400 may be executed in conjunction with the workflow 300. For example, the workflow 400 may be executed responsive to execution of a chunking function with respect to the workflow 300. In some examples, the system 100 and/or one or more components thereof may execute and/or implement the workflow 400. For example, the processing circuits 110 may execute the workflow 400. As another example, the workflow 400 may be a sub-routine of the workflow 300.

In some examples, the processing circuits 110 may receive a list of one or more strings and/or characters. For example, the processing circuits 110 may receive, from the user device 165, a list of one or more products and/or programs. The list may include indications of one or more names (e.g., keywords) that correspond to respective products and/or programs. For example, the processing circuits 110 may receive a list that includes a formal name for a product as well as one or more popular or common names for the same product. As another example, the processing circuits 110 may receive a mapping that routes one or more common names to an underlying formal name.

In some examples, the processing circuits 110 may store the lists as metadata. For example, the processing circuits 110 may store the lists as flags and/or tags within the database 155. As another example, the processing circuits 110 may ingest a map, within the vector DB 210, that maps the lists to corresponding vector embeddings. As an example, metadata 405 is shown to include one or more Boolean outcomes that correspond to the vector 305a and the vector 305d. The metadata 405 includes one or more keywords which indicate that vector 305a and the vector 305d include information that pertains to the keywords.

In some examples, the metadata 405 may map to one or more embeddings that represent and/or refer to an underlying product and/or program. For example, the metadata 405 may indicate that a given vector embedding represents a given product or product name. As another example, the metadata 405 may distinguish a first vector from a second vector by mapping to the first vector. Stated otherwise, the first vector and the second vector may appear to be similar (e.g., described a similar product) and the metadata 405 mapping to the first vector may indicate that the first vector is the accurate vector.

In some examples, the metadata 405 may represent embeddings of program names and/or product names, within the vector DB 210, such that corresponding vector embeddings may be filtered using the metadata 405. For example, first metadata 405 may map one or more first embeddings 160 to a given product name. In this example, the processing circuits 110 may filter the database 155, using the first metadata 405, to identify the first embeddings 160.

FIG. 5 depicts a workflow 500, according to some examples. In some examples, the workflow 500 illustrates utilization of the metadata 405 during inference time. The metadata 405 may include one or more plan name equivalents which list or indicate names that refer to the same program or product. For example, FIG. 5 illustrates that the metadata 405 may include one or more lists (shown as PLAN_NAME_EQUIVALENCIES) which indicates that "Program One Plus," Program One Select," Program One Elite," and "Program One Promote" all correspond to the same program. Stated otherwise, a query that mentions one or more of the above program names pertains to the same program. As a result, each program name may be used as filter to identify one or more vector embeddings. As another example, a 24-hour nurse line is shown to include three equivalent plan names.

In some examples, the processing circuits 110 may use the plan equivalent names (e.g., the metadata 405) to filter or otherwise search the vector DB 210 prior to retrieval of one or more vector embeddings. Stated otherwise, the plan equivalent names may restrict and/or confine the retrieval to one or more vector embeddings that correspond to the similar names.

Figure 6:
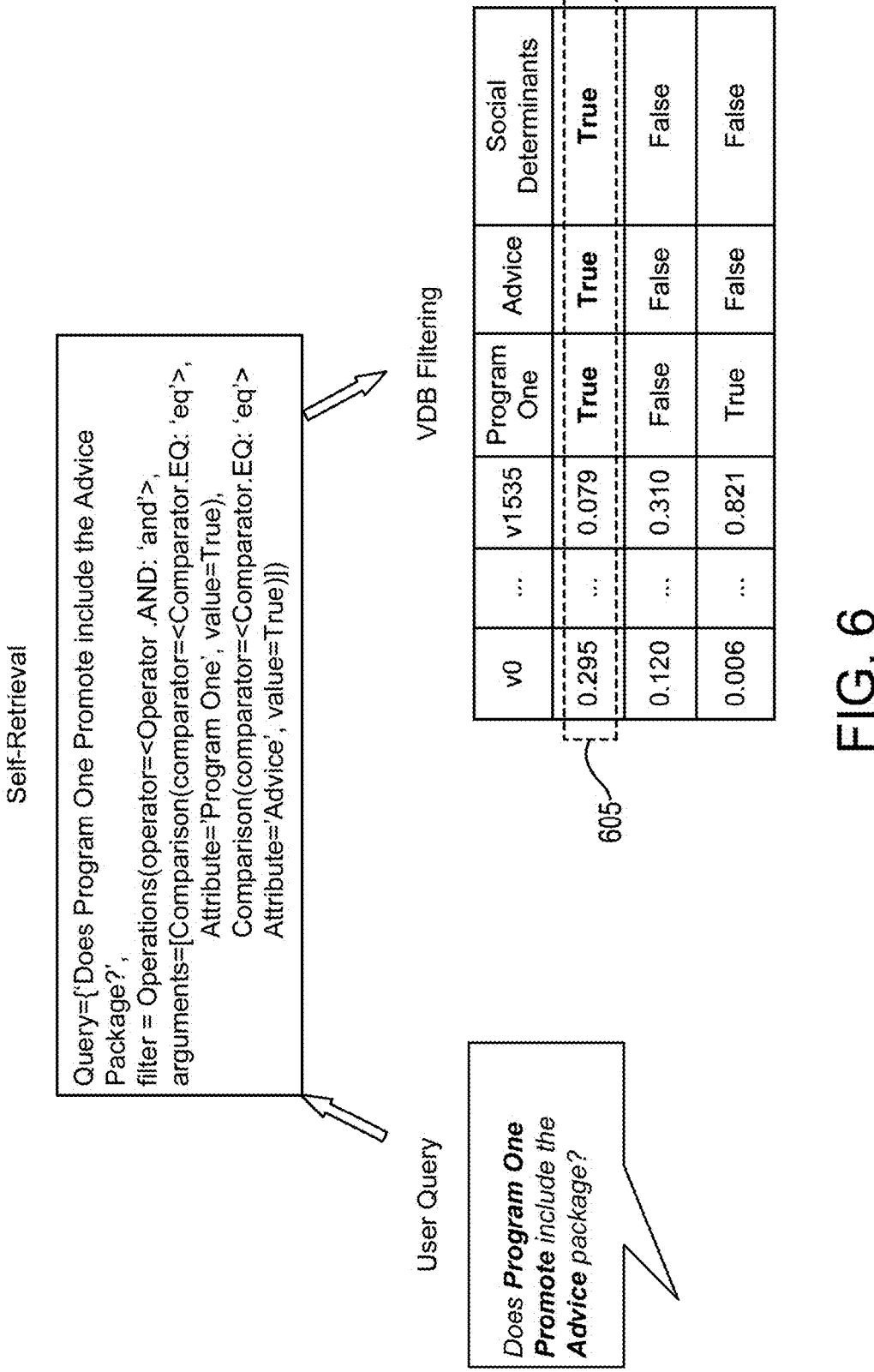
FIG. 6 is a workflow illustrating filtering of a vector database using metadata tags, according to some examples.

FIG. 6 depicts workflow 600, according to some examples. In some examples, the workflow 600 may be executed with and/or in conjunction with at least one of the workflow 200, the workflow 300, the workflow 400, and/or the workflow 500. Additionally, and/or alternatively, the workflow 600 may be executed responsive to generation of the vector DB 210. In some examples, the system 100 and/or one or more components thereof may implement and/or execute the workflow 600. For example, the processing circuits 110 may implement the workflow 600.

In some examples, processing circuits 110 may receive one or more queries. For example, the processing circuits 110 may receive one or more natural language queries from the user device 165. In some examples, the queries may include one or more requests for information. For example, as shown in FIG. 6, the workflow 600 includes a user query that asks, "Does Program One Promote include the Advice package." Stated otherwise, the user query includes a natural language message that includes a request for information (e.g., a response).

In some examples, the natural language query may refer to and/or include a request for information that is associated with one or more entities. For example, the user query of FIG. 6 is shown to include a request for information about whether the Advice package (e.g., an entity, a product, a program, etc.) is includes in Program One Promote. As another example, the user query may include a request for information about one or more services and/or offerings provided by a program.

In some examples, the processing circuits 110 may generate one or more vector embeddings. For example, the processing circuits 110 may generate a vector embedding that represents the natural language query. The processing circuits 110 may generate the vector embedding using at least one of the various techniques and/or workflows described herein. For example, the processing circuits 110 may execute the RAG 215 to generate the vector embedding.

In some examples, the processing circuits 110 may consume one or more databases. For example, the processing circuits 110 may consume at least one of the database 155 or the vector DB 210. The processing circuits 110 may search a database that includes one or more vector embeddings. For example, the processing circuits 110 may consume the database 155 that includes the embeddings 160. As another example, the processing circuits 110 may consume a database that includes the vectors 305.

In some examples, the processing circuits 110 may identify one or more vector embeddings, responsive to searching and/or querying of a database. For example, the processing circuits 110 may identify one or more vector embeddings of the database 155. As another example, the processing circuits 110 may receive one or more results (e.g., vector embeddings) responsive to execution of the RAG 215.

In some examples, the processing circuits 110 may detect one or more sets of metadata. For example, as shown in FIG. 6, the workflow 600 includes execution of one or more filters to indicate one or more tags between keywords and vector embeddings. As another example, the processing circuits 110 may detect metadata 405 that maps to the vector embeddings. In some examples, the processing circuits 110 utilize the metadata to distinguish or otherwise differentiate respective vector embeddings of a vector database. In some examples, the tags may identify at least one of characters and/or data strings. For example, the vector DB 210 may include tags to distinguish vector embeddings from one another. Stated otherwise, the tags may include information which indicate or identify corresponding vector embeddings for utilization in generating one or more responses to a respective natural language query.

In some examples, the processing circuits 110 may select one or more vector embeddings that corresponding to an entity. For example, the processing circuits 110 may select one or more vector embeddings that correspond to an entity identified in a natural language query. As another example, the processing circuits 110 may select a vector 605 based on a match between the vector 605 and corresponding metadata. As shown in FIG. 6, the workflow 600 includes filtering the vectors according to whether one or more vector embeddings include a mention and/or corresponding metadata about each of Program One, Advice, and Social Determinants. Additionally, as shown in FIG. 6, the vector 605 returns true (e.g., mentions) for each of the filters.

In some examples, the processing circuits 110 may generate one or more responses. For example, the processing circuits 110 may provide, as one or more inputs, the selected vector embeddings to the ML model 122 which cause the ML model 122 to generate one or more outputs. The outputs may refer to and/or include responses to the natural language query. For example, the ML model 122 may generate an output that includes a message which identifies an answer and/or a response to the natural language query.

In some examples, the processing circuits 110 may provide an electronic message to one or more computing devices. For example, the processing circuits 110 may provide an electronic message to the user device 165. In some examples, the electronic message may refer to and/or include the response generated by the ML model 122. For example, the electronic message may include the response that was generated based on the user query of FIG. 6. As another example, the electronic message may include one or more sets of information that address and/or answer the natural language query.

In some examples, the processing circuits 110 may identify vector embeddings that correspond to one or more entities. For example, the processing circuits 110 may identify a first vector embedding that corresponds to a first entity and a second vector embedding that corresponds to a second entity. The first entity and the second entity may refer to and/or represent respective programs and/or products. For example, the first entity may include a first program and the second entity may include a second program.

In some examples, the first entity and the second entity may include one or more similarities between characters and/or data strings. For example, the first entity may refer to a program name of "Program One Promote" and the second entity may refer to a program name of "Program One Assist." As illustrated in this example, the program name of the first entity and the program name of the second entity include overlapping words (e.g., characters). Stated otherwise, one or more portions of the first entity may be undistinguishable from one or more portions of the second entity. In some examples, the processing circuits 110 may determine one or more distances between vector embeddings. For example, the processing circuits 110 may determine a Euclidean distance between respective embeddings of the embeddings 160.

In some examples, the processing circuits 110 may detect that one or more distances between vector embeddings are less than a predetermined threshold. For example, the processing circuits 110 may detect that a distance between a first vector embedding and a second vector embedding is less than a predetermined threshold. In some examples, the processing circuits 110 may search one or more vector database for metadata associated with the first vector embedding and metadata associated with the second vector embedding. For example, the processing circuits 110 may search the vector DB 210 for one or more tags.

Figure 7:
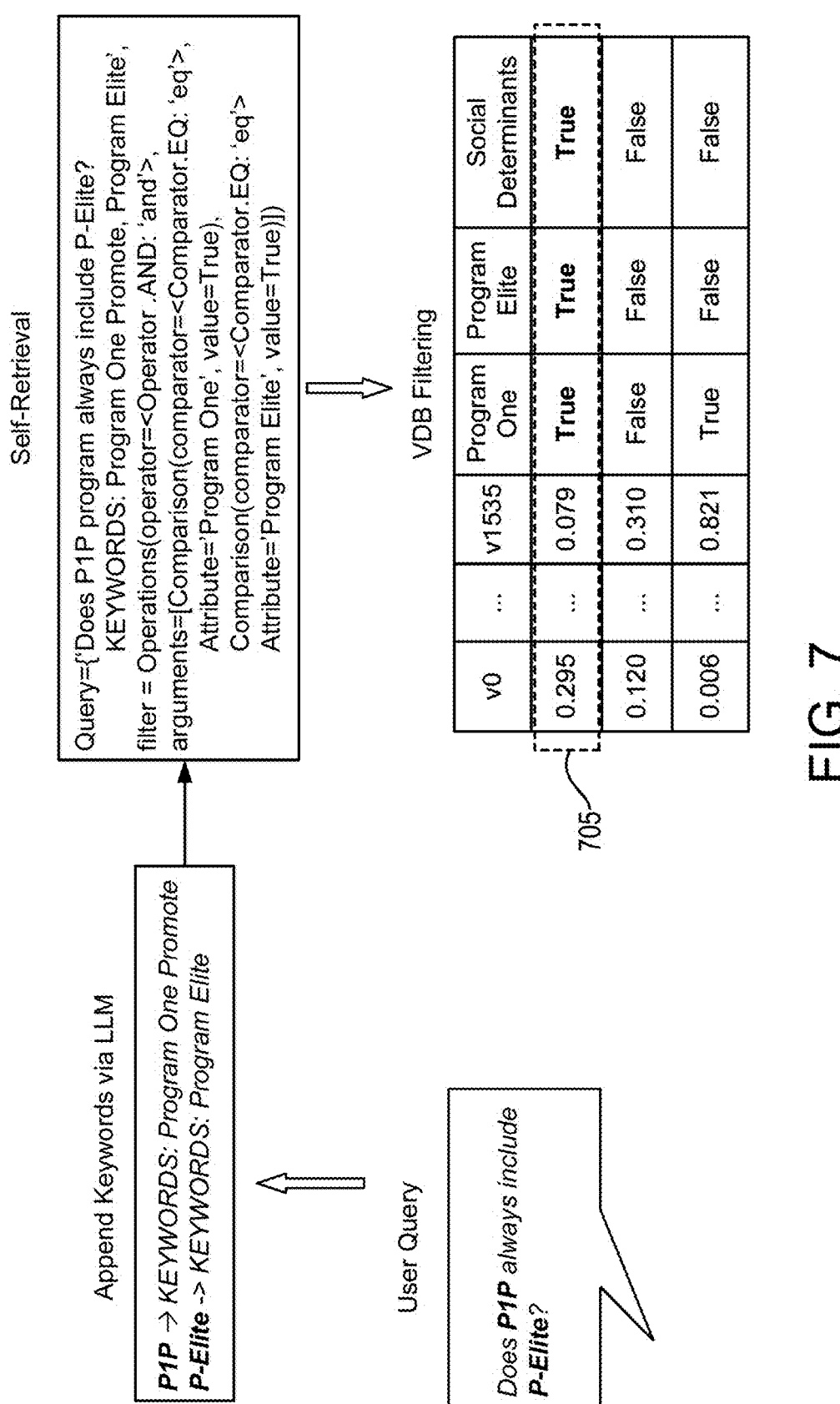
FIG. 7 is a workflow illustrating generation of one or more query inputs for which to search a vector database, according to some examples.

FIG. 7 depicts a workflow 700, according to some examples. In some examples, the workflow 700 may be executed with and/or in conjunction with the workflow 600. For example, the workflow 700 may be executed during the self-retrieval of the workflow 600. In some examples, the system 100 and/or one or more components thereof may execute and/or implement the workflow 700. For example, the processing circuits 110 may execute the workflow 700.

In some examples, the processing circuit 110 may receive one or more natural language queries that correspond to entities with one or more identifiers. For example, a first entity may include a first identifier and a second identifier. As another example, a program may include a formal name (e.g., an identifier) and a common name (e.g., an identifier). In some examples, the vector DB 210 may include one or more sets of information to define, indicate, and/or otherwise link identifiers to one another. For example, the vector DB 210 may include a link between a formal name of a program and a common name of the program. As another example, the vector DB 210 may include a link between a formal name and one or more nicknames for a product. As even another example, the vector DB 210 may include a link between a formal name and one or more abbreviations and/or acronyms.

As an example, in FIG. 7, the vector database is shown to be filtered using one or more keyword searches that match an acronym P1P to an underlying program name "Program One Promote." Stated otherwise, the processing circuits 110 may detect a link between P1P and the program name based on one or more tags ingested in the vector database. In some examples, given that the vector embeddings represent information retrieved from the data sources 170, the vector embeddings may typically include references to formal names. Stated otherwise, given that the information is retrieved from a data source associated with the entities, programs, products, and/or offerings, the names within the information are likely to be the formal or actual name of the entities. Accordingly, a query or a search of the vector database, using the common name or abbreviation, is likely to return zero results.

In some examples, the processing circuits 110 may receive one or more natural language queries that include an acronym or common name. For example, the processing circuits 110 may receive a natural language query having the acronym P1P. In some examples, the processing circuits 110 may modify the natural language queries to replace one or more characters. For example, the processing circuits 110 may replace P1P with the underlying formal name "Program One Promote." In some examples, the processing circuits 110 may generate one or more vector embeddings, for the natural language queries, responsive to replacing and/or modifying the natural language queries.

Figure 8:
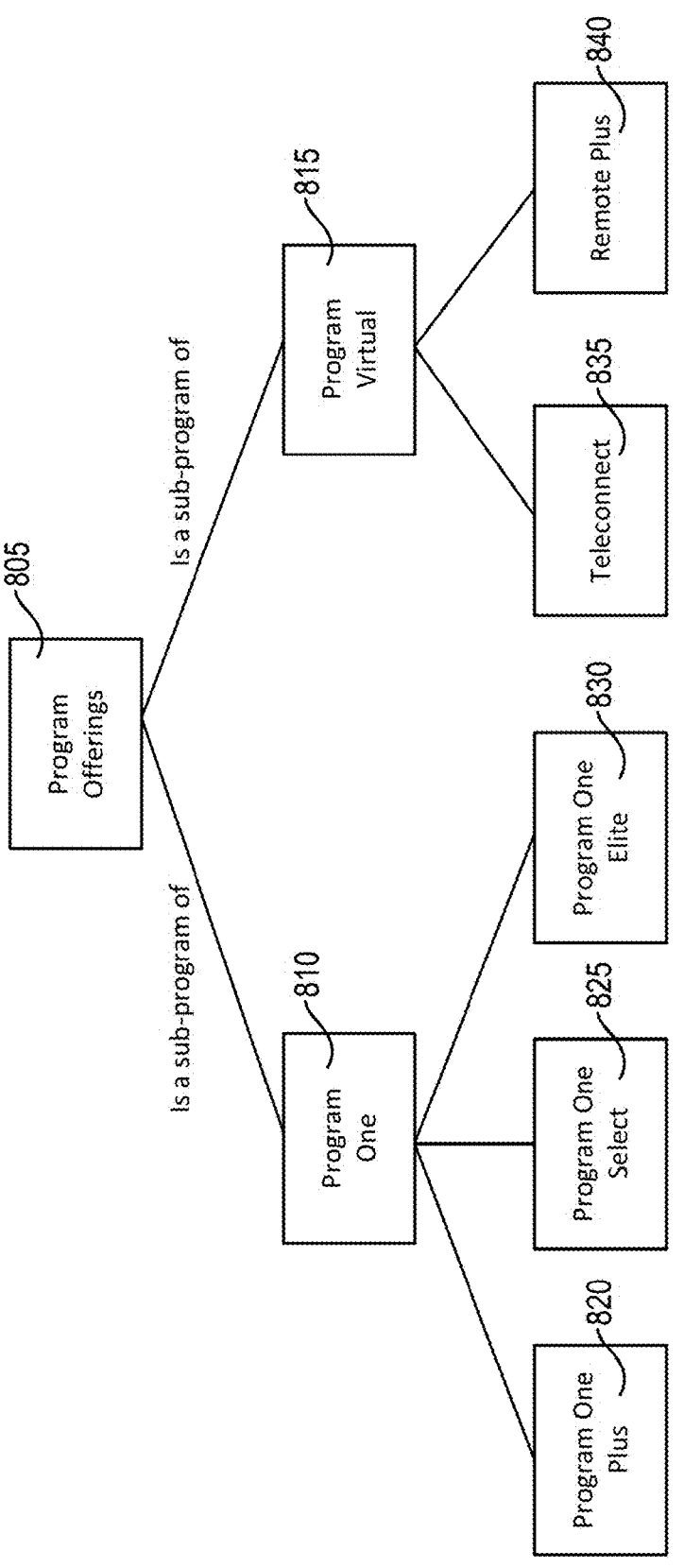
FIG. 8 is a graph including a hierarchical relationship between one or more entities, according to some examples.

FIG. 8 depicts a graph 800, according to some examples. In some examples, the graph 800 may represent one or more hierarchical relationships between entities. For example, the graph 800 may include one or more nodes that are connected to one another via edges (e.g., connections, linkages, etc.). As another example, the graph 800 may include one or more levels that indicates dependencies between products, programs, entities, and/or offerings.

As shown in FIG. 8, the graph 800 includes a program offerings node (shown as node 805) which represents that each node located beneath the node 805 is a program offering. Stated otherwise, the node 805 indicates that the graph 800 corresponds to program offerings. In some examples, the graph 800 may include a Program One node (shown as node 810) and a Program Virtual node (shown as node 815). The node 810 and the node 815 may refer to and/or represent children nodes with respect to the node 805. For example, each of the node 810 and the node 815 directly depend from the node 805. In some examples, the node 810 and the node 815 may have a hierarchical relationship with respect to the node 805. For example, the linkage between the node 805 and the node 810 indicates that Program One is a Program Offering.

In some examples, the graph 800 may include a Program One Plus node (shown as node 820), a Program One Select node (shown as node 825), and a Program One Elite node (shown as node 830). As shown in FIG. 8, the node 820, the node 825, and the node 830 are shown as being connected to the node 810. Stated otherwise, the node 820, the node 825, and the node 830 depend from the node 810. In some examples, the hierarchical relationship between the node 810 and each of the node 820, the node 825, and node 830 may provide one or more contexts. For example, the linkage between the node 820 and the node 810 may indicate that information pertinent to Program One Plus may not be relevant for either Program One Select or Program One Elite. Stated otherwise, each of the programs may include separate and/or distinct features or offerings.

In some examples, the processing circuits 110 may determine that one or more natural language queries include characters indicative of one or more nodes. For example, the processing circuits 110 may determine that a natural language query includes a data string of characters associated with the node 810. As another example, the processing circuits 110 may determine that a natural language query includes a data string of character associated with the node 825.

In some examples, the processing circuits 110 may retrieve one or more sets of information based on the nodes of the graph 800. For example, the processing circuits 110 may retrieve one or more tags and/or string searches that correspond to the node 820. As another example, the processing circuits 110 may retrieve metadata that corresponds to the node 825. In some examples, the processing circuits 110 may search the vector DB 210 using the retrieved information that is associated with one or more nodes and/or underlying entities.

Figure 9:
FIG. 9 is a flow chart of a method to update a database, according to some examples.

FIG. 9 depicts a flow chart of a method 900, according to some examples. In some examples, the system 100 and/or one or more systems, components, elements, and/or devices thereof may implement the method 900 and/or one or more steps thereof. For example, the processing circuits 110 may implement at least one step of the method 900. In some examples, the method 900 and/or one or more steps thereof may be modified and/or changed such that steps may be added, removed, combined, separated, repeated, omitted, skipped, reproduced, replicated, and/or otherwise altered. For example, a first step may be combined with a second step. As another example, a first step may be split into two or more discrete and/or separate steps.

In some examples, block 905 may refer to and/or represent an application programing interface (API) for which one or more sets of information may be retrieved. For example, the processing circuits 110 may retrieve, via the block 905, one or more sets of information from the data sources 170. In some examples, the block 905 may include one or more steps and/or elements. For example, as shown in FIG. 9, the block 905 includes step 910, step 915, step 920, and step 925. In some examples, the block 905 and/or one or more steps thereof may be modified and/or changed. For example, one or more steps of the block 905 may be omitted and/or skipped. As another example, one or more steps of the block 905 may be replicated.

In some examples, at step 910, one or more refresh scripts may be executed. For example, the processing circuits 110 may execute a refresh script with respect to at least one of the data sources 170*a*, the data source 170*b*, and/or the data source 170*c*. The processing circuits 110 may execute the refresh script to monitor when changes in the information, stored by the data sources 170, have changed. For example, the data sources 170 may provide and/or indicate time-stamps regarding when information was last updated and/or added. In some examples, the processing circuits 110 may detect a new and/or a changed timestamp, responsive to execution of the refresh script.

In some examples, the processing circuits 110 may compare, responsive to detection of one or more changes to information at the data sources 170, the information at the data sources 170 with one or more sets of information previously stored and/or represented by the embeddings 160. Stated otherwise, the processing circuits 110 may determine if the information represented by the embeddings is no longer valid and/or up to date. In some examples, the processing circuit 110 may determine that one or more sets of additional and/or new information have been added to the data sources 170. For example, the processing circuits 110 may compare metadata, associated with information at the data sources 170, with metadata associated with the embeddings 160. The processing circuits 110 may compare the metadata to determine if the information, at the data sources 170, has changed and/or is different relative to the information represented by the embeddings 160. For example, first metadata for a given embedding 160 may provide an indication of an underlying document for which the given embedding 160 was generated. The processing circuits 110 may detect one or more changes if second metadata, of the underlying document, indicates that one or more changes to the underlying document have occurred.

In some examples, at step 915, one or more re-embedding functions may be executed. For example, the processing circuits 110 may re-embed, regenerate, and/or refresh one or more embeddings of the embeddings 160. In some examples, the processing circuits 110 may re-embed the embeddings 160 to reflect and/or represent the changes and/or updates to the information stored by the data sources 170. Stated otherwise, the processing circuits 110 may update and/or fresh the embeddings 160 such that the embeddings 160 reflect the most recent and/or up to date information.

In some examples, at step 920, one or more clock functions may be executed. For example, the processing circuits 110 may record and/or document one or more timestamps that represent one or more points in time for which the embeddings 160 were re-embedded. Stated otherwise, the processing circuits 110 may create time logs to indicate when the embeddings 160 were updated.

In some examples, at step 925, a vector database may be updated. For example, the processing circuits 110 may replace one or more first embeddings 160 with one or more second embeddings 160. As another example, the processing circuits 110 may ingest and/or add one or more new embeddings into the database 155. In some examples, the processing circuits 110 may update the vector DB 210 to reflect the most recent and/or up to date sets of information.

In some examples, the processing circuits 110 may detect conflicts between one or more sets of information. For example, the data source 170*a* and the data source 170*b* may both include information associated with a first product. The information of the data source 170*a* may include and/or indicate one or more first offerings for the first product. As another example, the information of the data source 170*b* may include and/or indicate one or more second offerings for the first product. In some examples, the one or more first offerings and the one or more second offerings may be different (e.g., conflict with one another).

In some examples, the processing circuits 110 may determine a ranking and/or score with respect to each data source 170. For example, the processing circuits 110 may determine a ranking of the data source 170*a* and a ranking of the data source 170*b*. In some examples, the processing circuits 110 may utilize the rankings of the data sources 170 to determine one or more sources of truth and/or reliability metrics. For example, the data source 170*a* may correspond to a website of an entity that offers the first product. The data source 170*b* may correspond to an online publication produced by a third-party entity that is unassociated with the first product. In this example, given that the data source 170*a* corresponds to an underlying entity of the first product, the processing circuit 110 may determine a higher ranking for the data source 170*a* relative to the data source 170*b*.

In some examples, the processing circuits 110 may utilize one or more portions of information based on the rankings of the data sources 170*a*. For example, the processing circuits 110 may utilize the information, at the data source 170*a*, instead of the information at the data source 170*b* based on the data source 170*a* having a higher ranking. As another example, the processing circuits 110 may cross-compare and/or cross-reference information at one or more data sources 170 to determine a majority and/or consensus between the data sources 170. For example, the processing circuits 110 may select a first set of information based on the data source 170*a* and the data source 170*b* both included the first set of information. In this example, the data source 170*c* may include a second set of information which conflicts with the first set of information. However, given that the first set of information is present at the data source 170*a* and the data source 170*b*, the processing circuits 110 may select the first set of information.

Figure 10:
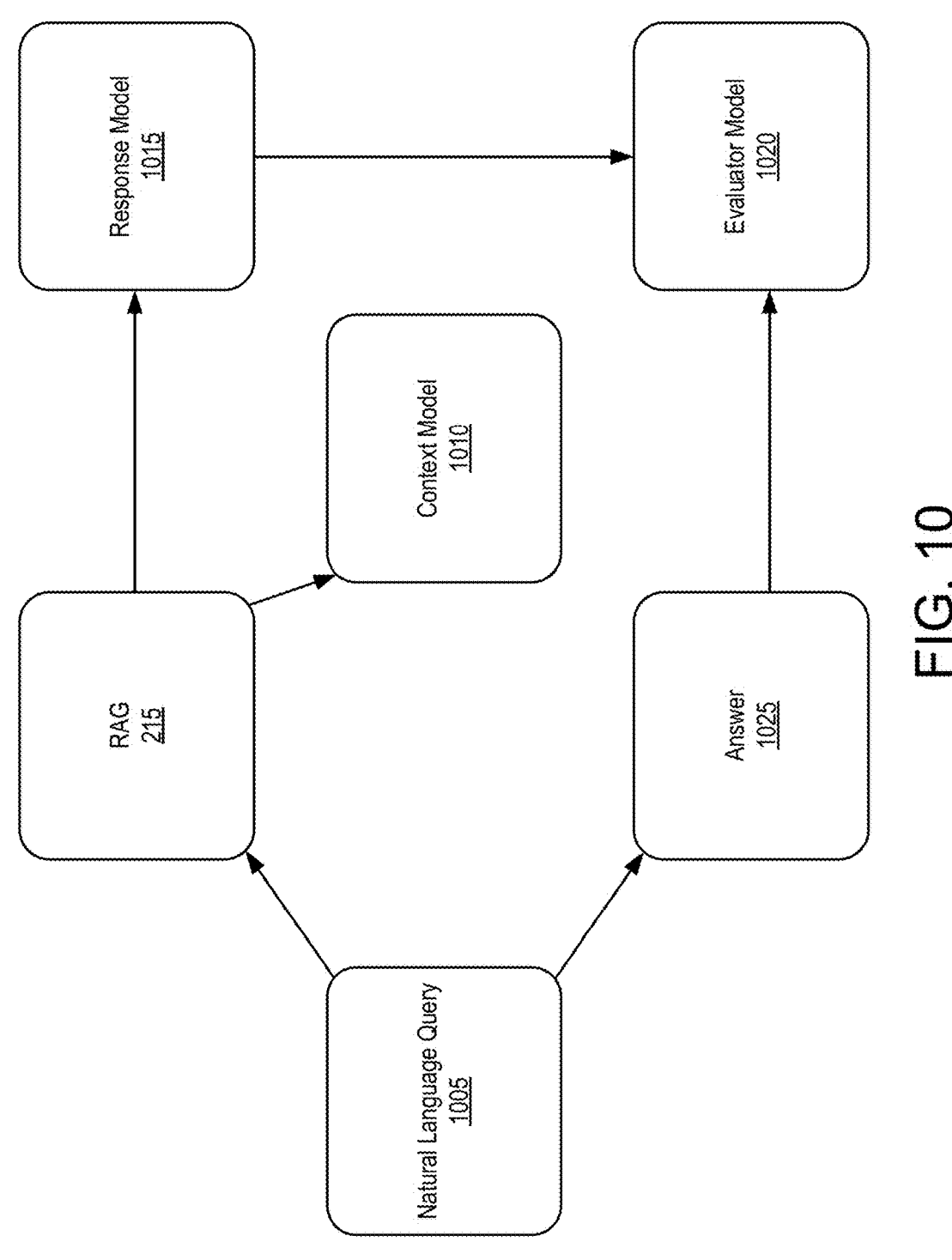
FIG. 10 is a workflow to compare responses of a machine learning model, according to some examples.

FIG. 10 depicts a workflow 1000, according to some examples. In some examples, the system 100 and/or one or more systems, components, elements, and/or devices thereof may implement the workflow 1000 and/or one or more portions thereof. For example, the processing circuits 110 may implement at least one portion of the workflow 1000. In some examples, the workflow 1000 and/or one or more portions thereof may be modified and/or changed such that steps may be added, removed, combined, separated, repeated, omitted, skipped, reproduced, replicated, and/or otherwise altered. For example, a first portion may be combined with a second portion. As another example, a first portion may be split into two or more discrete and/or separate portions. In some examples, the workflow 1000 and/or one or more portions thereof may be executed to compare responses of a machine learning model. For example, the workflow 1000 may be executed to compare responses of the ML model 122.

In some examples, the workflow 1000 may include one or more natural language queries 1005. For example, the natural language queries may refer to and/or include the natural language queries of the workflow 200. As another example, the natural language queries 1005 may refer to and/or include one or more utterances and/or inputs provided by the user device 165. In some examples, the natural language queries 1005 may include one or more requests for information.

In some examples, the natural language queries 1005 may be forwarded and/or otherwise provided to the RAG 215. The RAG 215 may execute and/or utilize at least one of a context model 1010 and/or response model 1015 to generate one or more responses to the natural language queries 1005. In some examples, the context model 1010 and the response model 1015 may refer to and/or include one or more discrete versions and/or configurations of the ML model 122. For example, the context model 1010 may represent a first ML model 122 and the response model 1015 may represent a second ML model 122. In some examples, the context model 1010 and/or the response model 1015 may execute at least one of the various techniques and/or processes described herein to generate one or more responses to the natural language queries 1005.

As shown in FIG. 10, the outputs of the response model 1015 and one or more answers 1025 may be provided to an evaluator model 1020. In some examples, the evaluator model 1020 may be a version and/or configuration of the ML model 122 that is trained to compare one or more machine learning generated responses with one or more human provided answers. For example, the evaluator model 1020 may compare one or more responses, to the natural language queries 1005, that were generated by the response model 1015 with the answers 1025 (e.g., correct response to the natural language queries 1005) that were provided by the user device 165.

In some examples, the evaluator model 1020 may determine a performance of one or more models responsive to comparing the responses with the answers 1025. For example, the evaluator model 1020 may determine one or more variances and/or differences between the responses and the answers 1025 to determine an accuracy (e.g., performance) of the ML model 122. As another example, the evaluator model 1020 may determine that the context and/or description of the responses match and/or correspond to the answers 1025.

Figure 11:
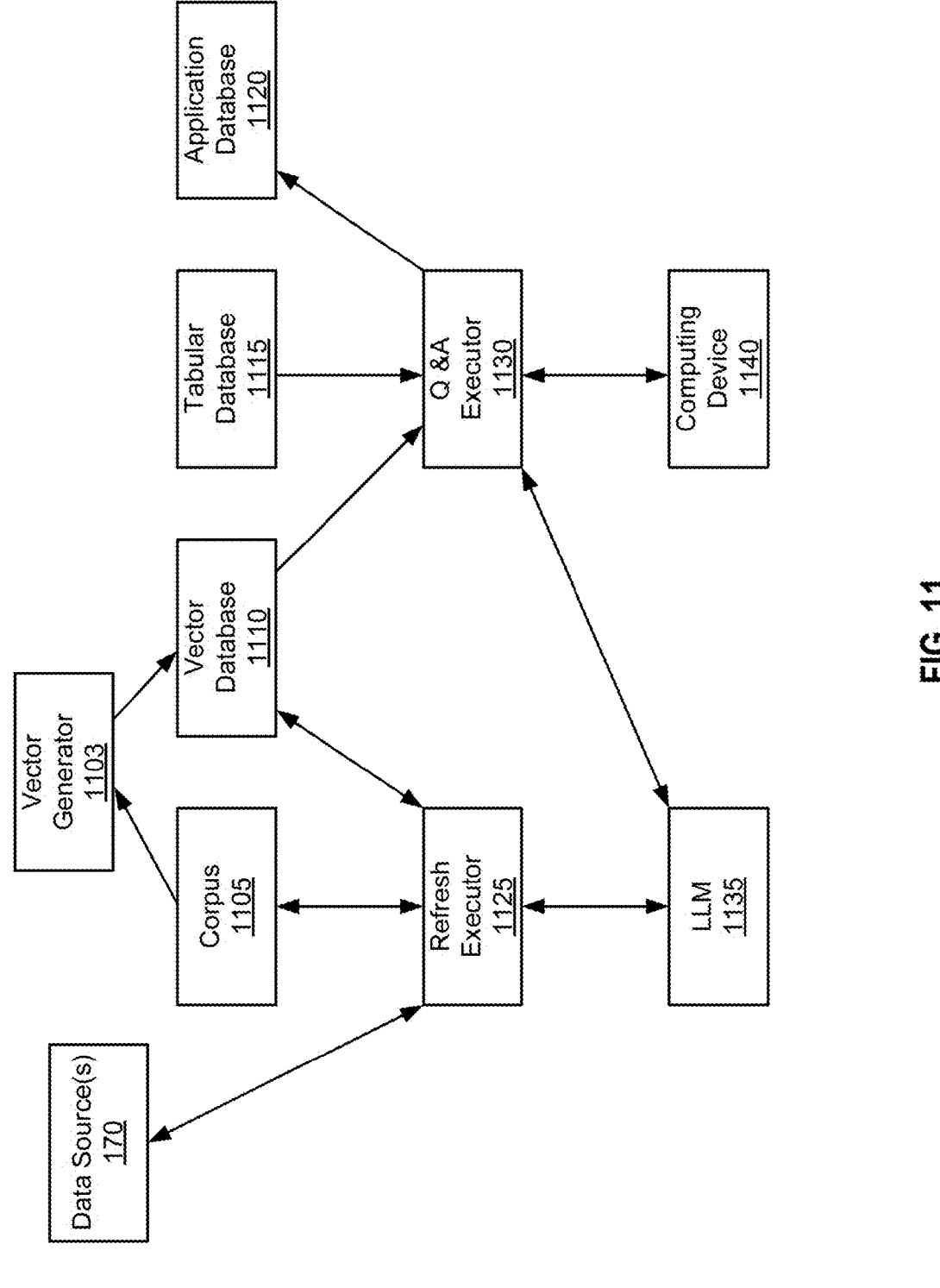
FIG. 11 is a block diagram of a system to provide one or more responses to natural language queries, according to some examples.

FIG. 11 depicts a block diagram of a system 1100, according to some examples. In some examples, the system 1100 may represent and/or refer to a system architecture of one or more components of the system 100. Additionally, and/or alternatively, the system 1100 may represent one or more discrete elements that may execute and/or implement at least one of the various workflows and/or methods described herein.

In some examples, the system 1100 may include the data sources 170. The data sources 170 may refer to and/or include one or more sets of documents. In some examples, the documents may be retrieved and/or come from at least one of documentation platforms, competitive intelligence products, industry reports, publications, and/or online resources. For example, the data sources 170 may include documentation platforms such as Highspot and/or Crayon. The documentation platforms may manage and/or search internal documentations. The documentation platforms may include one or more APIs that store and/or maintain metadata that is associated with one or more documents. The metadata may include information such as an update date, a data type, a data size, and/or other possible data metrics. For example, the metadata may indicate whether a given document is at least one of a PDF, CSV, DOC, PPT, image, Webpage, HTML, audio, and/or video.

In some examples, the system 1100 may include a corpus 1105. The corpus 1105 may refer to and/or include at least one database and/or data structure. For example, the corpus 1105 may represent one or more documents that were selected from the data sources 170. In some examples, the corpus 1105 may refer to cloud storage and/or remote storage. Information, stored at the corpus 1105, may be selected and/or otherwise retrieved.

In some examples, the system 1100 may include a vector database 1110. The vector database 1110 may refer to and/or include at least one of the various vector databases described herein. In some examples, the vector database 1110 may store, maintain, and/or otherwise contain one or more vector embeddings. The vector embeddings may represent one or more documents retrieved from the corpus 1105. In some examples, the vector database 1110 may include one or more clustered indexes. Additionally, and/or alternatively, the vector database 1110 may include one or more recall strategies for which the embeddings may be retrieved and/or accessed. In some examples, the vector embeddings may include one or more data types. For example, the vector embeddings may include a float vector having a given dimension and/or size. In some examples, the vector embeddings may include a dimension of 1536. The vector embeddings may include one or more associated metadata fields. For example, the vector embeddings may include the metadata fields generated by the workflow 400. Additionally, or alternatively, the vector embeddings may include one or more indexes that refer back to raw text that is represented by the vector embeddings.

In some examples, the system 1100 may include a vector generator 1103. The vector generator 1103 may generate one or more vector embeddings. As show in FIG. 11, the vector generator 1103 is positioned between the corpus 1105 and the vector database 1110. For example, the vector generator 1103 may take the corpus 1105, embed the corpus 1105 into vectors, and then generator a vector database. In some examples, the vector generator 1103 may include one or more embedding models. For example, the vector generator 1103 may include a version and/or configuration of the LLM 1135 that functions as an embedding model. The LLM 1135 may re-embed and/or generate one or more new embeddings for the vector database 1110. Additionally, and/or alternatively, corresponding metadata may be updated to reflect the changes and/or updates to the embeddings and/or underlying documentation. In some examples, the vector generator 1103 may execute and/or implement the workflow 400 and/or one or more portions or steps thereof. For example, the vector generator 1103 may extract metadata from documents and/or data sources.

In some examples, the system 1100 may include a tabular database 1115. The tabular database 1115 refer to and/or include a structured query language (SQL) database that includes and/or stored account-level entity information. The information, of the tabular database 1115, may be accessible and/or retrievable via one or more SQL queries. In some examples, the tabular database 1115 may include information such as, number of members per account, geographic locations of accounts, win probabilities at the case level from separate pre-trained ML model, recommendations for business actions stored as text, and/or product offerings. The tabular database 1115 may store information having one or more data types. For example, the tabular database 1115 may store information as one or more columnar objects.

In some examples, the system 1100 may include an application database 1120. The application database 1120 may represent an SQL database that includes logging, error messages, and/or information about the functioning of one or more tools and chatbots. For example, the application database 1120 may maintain natural language conversational history between one or more user devices 165 and the response system 105. In some examples, the conversational history may be indexed and/or sorted by one or more session IDs and/or timestamps. As another example, the application database 1120 may maintain feedback and/or input that was provided by one or more widgets and/or selectable elements. The feedback may include a numerical score, a free text feedback entry, a thumbs up, a thumbs down, and/or other possible forms of feedback. The application database 1120 may store the information as one or more data types. For example, the application database 1120 may store text as one or more columnar objects.

In some examples, the system 1100 may include a refresh executor 1125. In some examples, the refresh executor 1125 may generate, store, maintain, and/or otherwise produce at least one refresh history file. The refresh history file may refer to and/or include documentation which records a name, a source, and an update data of each document in the corpus 1105. Stated otherwise, the refresh history file is a snapshot of the documents in the vector database 1110 along with indications of underlying data sources, URLs, and recency. In some examples, the refresh history file may be stored as one or more SQL objects.

In some examples, the refresh executor 1125 may, for each document in the refresh history file, compare an update date (for a given data source) via API, vs the updated date in the Refresh history file snapshot. The refresh executor 1125 may compare the two dates to see if the data source has a later update date relative to the Refresh history file. Stated otherwise, the refresh executor 1125 may determine if the data source has more recent information relative to what is reflected in the refresh history file. In some examples, the refresh executor 1125 may update and/or set one or more flags responsive to a determination that a file of the data sources 170 has been updated. The refresh executor 1125 may receive one or more inputs such as, the refresh history file and one or more data source update dates. The refresh executor 1125 may receive the one or more inputs via APIs. The refresh executor 1125 may generate and/or provide one or more outputs, such as update embeddings for inclusion in the vector database 1110 and/or an updated refresh history file.

In some examples, the system 1100 may include at least one LLM 1135. The LLM 1135 may refer to and/or include at least one of the various machine learning models, artificial intelligence models, and/or transformers described herein. The LLM 1135 may include at least one pre-trained sequence to sequence (Seq2Seq) model and/or a model API. In some examples, the LLM 1135 may include models other than large language models. For example, the LLM 1135 may include a generative tool that consumes texts and outputs text via interference.

In some examples, the system 1100 may include at least one question and answer (Q&A) executor 1130. The Q&A executor 1130 may take in and/or receive questions (e.g., utterances, inputs, natural language queries, etc.), run retrievals, and deliver (e.g., output) one or more responses and/or answers. The Q&A executor 1130 may receive one or more text inputs and generate one or more text outputs. The Q&A executor 1130 is described in further detail with respect to FIG. 12.

Figure 12:
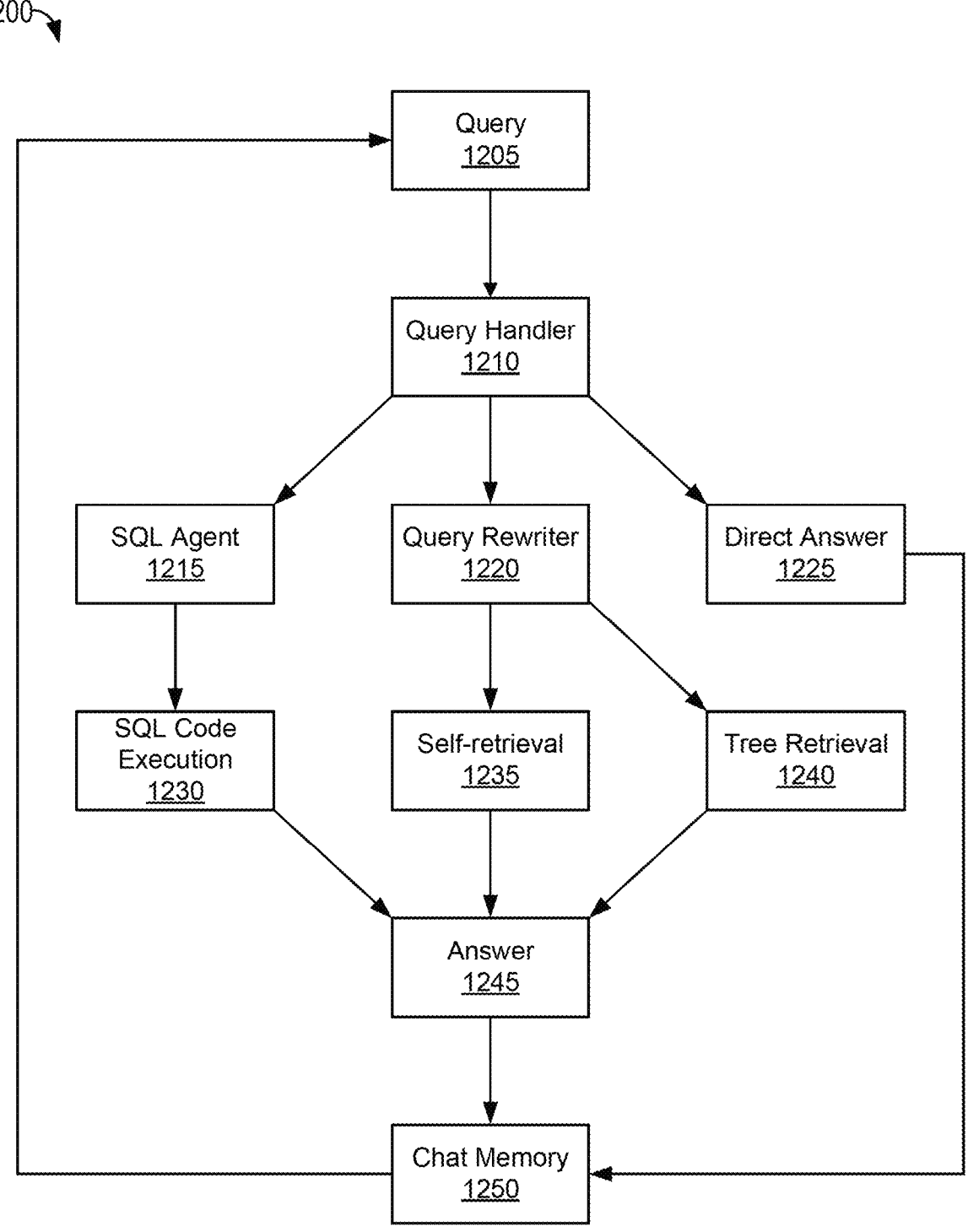
FIG. 12 is a workflow illustrating generation of one or more responses to natural language queries, according to some examples.

FIG. 12 depicts a workflow 1200, according to some examples. In some examples, the workflow 1200 may represent and/or illustrate one or more portions and/or sub-programs of the Q&A executor 1130. Stated otherwise, the Q&A executor 1130 may implement one or more portions of the workflow 1200. In some examples, the workflow 1200 and/or one or more portions thereof may include and/or implement at least one of the various methods and/or workflows described herein.

In some examples, the workflow 1200 may include receipt and/or delivery of one or more queries 1205. For example, the workflow 1200 may be initiated and/or instantiated responsive to the receipt of one or more natural language queries. As shown in FIG. 12, the workflow 1200 includes a query handler 1210. In some examples, the query handler 1210 may make one or more decisions regarding which agents to execute and/or implement. For example, as shown in FIG. 12, the query handler 1210 may implement and/or execute an SQL agent 1215 and/or a query rewriter 1220. Additionally, and/or alternatively, the query handler 1210 may determine that a query may be directly answered (e.g., the answer is present in the vector database).

In some examples, the query handler 1210 may execute the query rewriter 1220 responsive to a determination to utilize RAG context. Additionally, and/or alternatively, the query handler 1210 may execute the SQL agent 1215 responsive to a determination that tabular data may be utilized. In some examples, the query rewriter 1220 may parse the query 1205 to map at least one of words, phrases, abbreviations, acronyms, and/or nicknames to one or more keywords. The query rewriter 1220 may check the query 1205 for one or more keywords and/or append the keywords to the query 1205.

In some examples, the keywords may include a phrase that gains special meaning in a context. The keyword could be the name of a program or a product ("e.g. Program One"), or it could be an industry term ("Small-Group Segment") or a metric ("ROI"). Additionally, and/or alternatively, keywords may be installed in the Vector Database as Boolean metadata fields to enable self-retrieval. In some examples, the query rewriter 1220 may detect the keywords.

In some examples, the keywords may have any number of synonyms, which are identical in meaning but expressed in a different phrase. For example, the keyword could be an official program name, and its synonyms could be the friendly names or nicknames of the official program. (Keyword: "Program One Promote," Synonyms: "P1 Promote," and/or "P1P"). If a Keyword or a Synonym appears in a source document, an associated metadata field may be added to a corresponding embedding. In some examples, the metadata fields may refer to and/or include programmatically defined columns that are appended to a vector database. For example, the vector database may include Boolean columns which indicate whether a particular topic is mentioned within a document.

In some examples, the SQL agent 1215 may consume the user query 1205 to generate one or more outputs. For example, the SQL agent 1215 may output one or more SQL queries. As another example, the SQL agent 1215 may generate one or more database search strings.

In some examples, the query rewriter 1220 may execute a self-retrieval 1235 to consume one or more rewritten queries and corresponding keywords. The self-retrieval 1235 may retrieve and/or otherwise access one or more sets of information from the vector DB 210. In some examples, the self-retrieval 1235 may perform and/or determine one or more maximal marginal relevance (MMR) rankings. Additionally, and/or alternatively, the self-retrieval 1235 may decode one or more chunks (of the embeddings 160) and append the chunks to a context.

In some examples, the query rewriter 1220 may execute a tree retrieval 1240 to consume one or more rewritten queries and corresponding keywords. The tree retrieval 1240 may check for one or more named entities from an entity-relationship tree (e.g., the graph 800). In some examples, the tree retrieval 1240 may pull a T-RAG context (e.g., parents and children converted to text). The tree retrieval 1240 may append the text to the context.

In some examples, the SQL agent 1215 may implement SQL code execution 1230. The SQL agent 1215 may implement the SQL code execution 1230 to access one or more SQL databases. For example, the SQL agent 1215 may access the tabular database 1115. In some examples, the SQL agent 1215 may run, responsive to accessing the SQL database, one or more queries on the SQL database. The SQL agent 1215 may retrieve one or more results and parse the results into text. In some examples, the SQL agent 1215 may utilize the resultant text to form a context.

In some examples, the workflow 1200 may yield and/or produce at least one answer 1245. For example, the LLM 1135 may utilize retrieved Context or SQL context the generate and/or output the answer 1245. In some examples, the query handler 1210 may call the LLM 1135 to cause the LLM 1135 to generate the answer 1245. The answer 1245 may be presented, displayed, and/or produced for visual display. In some examples, if the retrieved context is from a vector database, the underlying passages that were used may be detected and then cited.

In some examples, the workflow 1200 may ensure that the vector database 1110 stays current and/or updated to date. For example, the refresh executor 1125 may execute and/or run a metadata refresh. The metadata refresh may be executed at one or more points in time (e.g., every day, every week, every month, etc.). The refresh executor 1125 may flag one or more documents as stale (e.g., the data sources having updated information). In some examples, the refresh executor 1125 may remove one or more old embeddings (e.g., out of date, expired, etc.) and/or corresponding chunks from the vector database 1110.

In some examples, upon completion of refreshing and/or updating the vector database 1110, the refresh executor 1125 may run diagnostics and/or other possible evaluation routines to evaluate one or more model scores. Upon completion of the evaluation of the model scores, the resultant vector database files may be uploaded and/or otherwise provided to one or more cloud storage systems and/or remote databases. In some examples, responsive to uploading of the vector database files, an underlying tool and/or chatbot may be redeployed and/or reimplemented. The underlying tool and/or chatbot may be directed to and/or otherwise pointed to the latest version of the vector database.

Figure 13:
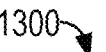
FIG. 13 is a flow chart of a method to evaluate a performance of one or more machine learning models, according to some examples.

FIG. 13 depicts a flow chart of a method 1300, according to some examples. In some examples, the method 1300 may be implemented and/or executed during the workflow 1000. For example, the method 1300 may be implemented while determining and/or evaluating a performance of one or more machine learning models. In some examples, the system 100 and/or one or more systems, components, elements, and/or devices thereof may implement the method 1300 and/or one or more steps thereof. For example, the processing circuits 110 may implement at least one step of the method 1300. In some examples, the method 1300 and/or one or more steps thereof may be modified and/or changed such that steps may be added, removed, combined, separated, repeated, omitted, skipped, reproduced, replicated, and/or otherwise altered. For example, a first step may be combined with a second step. As another example, a first step may be split into two or more discrete and/or separate steps.

In some examples, the method 1300 may include the determination of one or more scores and/or metrics. For example, the processing circuits 110 may determine one or more scores regarding the generation of responses for a pre-written diagnostic question. The pre-written diagnostic question may include a pre-written diagnostic answer (e.g., the answer 1025). In some examples, the scores may include an answer similarity metric that represents a comparison of two answers. For example, the comparison may be between a machine answer (e.g., a response generated by an LLM, ML model, etc.) an intended answer (e.g., pre-written answer). In some examples, the answer similarity metric may be at least one of a cosine similarity, a bilingual evaluation understudy (BLEU) metric, a recall-oriented understudy for gisting evaluation (ROUGE) metric, and/or other possible metrics generated by an LLM. The answer similarity metric may be at least one of Boolean or a number on a similarity scale.

In some examples, the scores may include a context relevance metric that represents a comparison between retrieved context and an underlying question. A high score may indicate that the retrieved context is relevant and that the retrieved context contains the answer to the question. In some examples, the context relevance metric may be a Boolean or a probability generated by an LLM.

In some examples, the scores may include a context used metric that represents a comparison between the context and the machine answer. The context used metric may determine if the contents of the context appear in the machine answer (e.g., topically present). In some examples, the context used metric may be a Boolean or a probability generated by an LLM.

In some examples, the scores may include a context consistent metric that represents a comparison between the context and a machine answer to determine if the machine answer is consistent with the context (e.g., semantically aligned). A low score may indicate that the LLM used specific information that was outside of the context. The context consistent metric may be a Boolean or a probability generated by an LLM.

In some examples, at step 1305, a determination as to whether a normalized score is below a threshold may occur. For example, the processing circuits 110 may determine a weight average of one or more of the metrics and/or scores described herein. In some examples, the threshold may be 0.8 which means that a normalized score that is less than 0.8 is below the threshold and that a normalized score that is equal or larger than 0.8 is above the threshold. In some examples, the method 1300 may proceed to step 1310 responsive to a determination that the normalized is not below the threshold. The method 1300 may proceed to step 1315 responsive to a determination that the normalized score is below the threshold.

In some examples, at step 1310, no action may be taken. For example, the processing circuits 110 may elect to not retrain and/or reinforce one or more models based on the normalized score being above the threshold. Stated otherwise, the processing circuits 110 may determine that models are performing properly (e.g., generating accurate responses).

In some examples, at step 1315, a determination as to whether the context relevant score is low may occur. If the one or more processing circuits determine that the context relevant score is low, the method 1300 may proceed to step 1325. In some examples, the method 1300 may proceed to step 1320 responsive to a determination that the context relevant score is not low.

In some examples, at step 1325, the context retrieval may be improved. For example, the processing circuits 110 may determine that the context retrieval can be improved by generated new metadata tags for key concepts. As another example, the query rewriter 1220 may determine to update and/or refresh new mappings between nicknames and friendly names. As another example, the T-RAG may be updated with new entity relationships. Additionally, and/or alternatively, MMR tuning and/or customization may occur to improve document prioritization.

In some examples, at step 1320 a determination as to whether context is used may occur. In some examples, the method 1300 may proceed to step 1330 responsive to determination that context was not used. The method 1300 may proceed to step 1335 responsive to a determination that context was used.

In some examples, at step 1330, the query handler may be improved. For example, the query handler 1210 may be improved by causing the query handler 1210 to execute and/or utilize retrieval. As another example, the query handler 1210 may be improved by reducing a base confidence level. As another example, the query handler 1210 may be improved by adding new concepts to personification prompts.

In some examples, at step 1335, a determination as to whether a context is consistent may occur. The method 1300 may proceed to step 1340 responsive to a determination that the context is not consistent. The method 1300 may proceed to step 1345 responsive to a determination that the context is consistent.

In some examples, at step 1340, one or more model hallucinations may be occurring. For example, the processing circuits 110 may determine that an LLM is experiencing hallucinations with one or more answers. In some examples, at step 1345, the Q&A executor 1130 may be updated. For example, a ground truth may be updated for the Q&A executor 1130. As another example, an expected answer for the Q&A executor 1130 may be updated.

The arrangement, construction, and description of the systems and methods as shown in the various exemplary examples are illustrative only. While some examples have been described herein, several modifications and/or adjustments are possible (e.g., variations in sizes, dimensions, structures, shapes and proportions of the various elements, values of parameters, mounting arrangements, use of materials, colors, orientations, etc.). For example, the position of elements can be reversed, modified, adjusted, and/or rearranged. As another example, the nature or number of discrete elements or positions can be altered or varied. Accordingly, all such modifications are intended to be included within the scope of the present disclosure. The order or sequence of any process or method steps described herein can be varied or re-sequenced according to alternative examples. Other substitutions, modifications, changes, and omissions can be made in the design, operating conditions, and arrangement of the exemplary examples without departing from the scope of the present disclosure.

The present disclosure contemplates methods, systems, and program products on any machine-readable media for accomplishing various operations. The examples of the present disclosure can be implemented using existing computer processors, or by a special purpose computer processor for an appropriate system, incorporated for this or another purpose, or by a hardwired system. Examples within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising one or more memory devices storing instructions thereon that, when executed by one or more processors, cause the one or more processors to:

receive, from a first computing device, a natural language query for information associated with a first entity;

generate a vector embedding based on the natural language query;

search, responsive to generation of the vector embedding, a vector database having a plurality of vector embeddings to identify a set of vector embeddings of the plurality of vector embeddings that are associated with the vector embedding, each vector embedding of the set of vector embeddings corresponding to an entity of a plurality of entities;

identify, for each vector embedding of the set of vector embeddings, metadata that is linked to a corresponding vector embedding of the set of vector embeddings within the vector database;

select, based on the metadata for each vector embedding of the set of vector embeddings, a first vector embedding of the set of vector embeddings that corresponds to the first entity, selecting the first vector embedding comprising determining that the first vector embedding corresponds to the first entity using the metadata for the first vector embedding;

generate a prompt based on the natural language query using context provided by the first vector embedding and the metadata for the first vector embedding;

generate, by providing the prompt to a machine learning model, a response to the natural language query; and provide, to the first computing device, an electronic message that includes the response to the natural language query.

2. The system of claim 1, wherein a second vector embedding of the set of vector embeddings corresponds to a given entity of the plurality of entities, and wherein the instructions further cause the one or more processors to:

detect, responsive to identification of the set of vector embeddings, that a distance between the first vector embedding and the second vector embedding is less than a predetermined threshold;

search, responsive to detection that the distance is less than the predetermined threshold, the vector database for (1) the metadata for the first vector embedding and (2) the metadata for the second vector embedding; and differentiate, using the metadata for the first vector embedding and the metadata for the second vector embedding, the first entity from the given entity.

3. The system of claim 1, wherein the instructions further cause the one or more processors to:

retrieve, from a plurality of data sources, one or more sets of information associated with the plurality of entities;

generate, responsive to retrieval of the one or more sets of information, the plurality of vector embeddings; and ingest the plurality of vector embeddings into the vector database.

4. The system of claim 3, wherein generation of the plurality of vector embeddings includes the instructions causing the one or more processors to:

split the one or more sets of information into a plurality of segments;

identify contents of each segment of the plurality of segments; and apply, based on a match between the contents of a segment of the plurality of segments and the metadata for the first vector embedding, a first tag to the first vector embedding.

5. The system of claim 1, wherein one or more tags identify a set of characters or a data string to distinguish the first vector embedding from at least one second vector embedding of the set of vector embeddings.

6. The system of claim 1, wherein the first entity includes a first identifier and a second identifier, wherein the vector database includes information indicative of the first identifier, wherein the natural language query includes one or more first characters associated with the second identifier, and wherein the instructions further cause the one or more processors to:

detect, responsive to identification of the one or more first characters, that the vector database includes second metadata to indicate a link between the second identifier and the first identifier;

modify, responsive to detection of the second metadata, the natural language query to replace the one or more first characters with one or more second characters associated with the first identifier; and generate, using the natural language query including the one or more second characters, the vector embedding.

7. The system of claim 1, wherein the instructions further cause the one or more processors to:

receive, from a second computing device, a data structure that includes a plurality of mappings between respective identifiers of a plurality of identifiers, each identifier of the plurality of identifiers associated with a respective entity of the plurality of entities, and a first mapping of the plurality of mappings to indicate that (1) a first identifier of the plurality of identifiers corresponds to the first entity and (2) one or more second identifiers of the plurality of identifiers represent the first identifier;

determine, responsive to receipt of the natural language query, that the natural language query includes the one or more second identifiers;

detect, based on the first mapping, that the one or more second identifiers represent the first identifier; and modify the natural language query to replace the one or more second identifiers with the first identifier.

8. The system of claim 1, wherein the instructions further cause the one or more processors to:

determine that the natural language query includes one or more characters indicative of a first node of a plurality of nodes within a hierarchical graph, the first node connected to one or more second nodes of the plurality of nodes, and the first node representative of the first entity;

retrieve, from one or more data sources, one or more sets of information associated with one or more second entities of the plurality of entities that are represented by the one or more second nodes; and search the vector database using the one or more sets of information.

9. The system of claim 8, wherein each node of the plurality of nodes represents a respective entity of the plurality of entities, wherein the hierarchical graph includes (1) a top level having the first node and (2) a bottom level having the one or more second nodes, and wherein a connection between the first node and the one or more second nodes indicates a hierarchical relationship between the first entity and the one or more second entities.

10. The system of claim 1, wherein the instructions further cause the one or more processors to:

retrieve, from each data source of a plurality of data sources, one or more sets of information associated with the plurality of entities;

detect a conflict between a first portion of the one or more sets of information retrieved from a first data source of the plurality of data sources and a second portion of the one or more sets of information retrieved from a second data source of the plurality of data sources;

determine, responsive to detection of the conflict, a first ranking for the first data source and a second ranking for the second data source;

compare the first ranking for the first data source and the second ranking for the second data source; and utilize, responsive to comparison of the first ranking and the second ranking, the first portion to identify the set of vector embeddings.

11. The system of claim 1, wherein the instructions further cause the one or more processors to:

transmit, to one or more data sources, one or more application programming interface (API) calls to retrieve one or more data structures that represent information associated with one or more entities of the plurality of entities;

compare, responsive to retrieval of the one or more data structures, metadata associated with the one or more data structures with metadata associated with one or more vector embeddings of the plurality of vector embeddings that correspond to the one or more entities;

detect one or more differences between the one or more data structures and the one or more vector embeddings; and update, responsive to detection of the one or more differences, the vector database to replace the one or more vector embeddings with one or more second vector embeddings that correspond to the one or more data structures.

12. The system of claim 1, wherein the instructions further cause the one or more processors to:

receive, responsive to generation of the response, one or more second responses that accurately address the natural language query;

execute, responsive to receipt of the one or more second responses, a second machine learning model to evaluate the response based on information associated with the one or more second responses; and determine, responsive to execution of the second machine learning model, a performance of the machine learning model with respect to generation of the response.

13. A method, comprising:

receiving, by one or more processing circuits, from a first computing device, a natural language query for information associated with a first entity;

generating, by the one or more processing circuits, a vector embedding based on the natural language query;

searching, by the one or more processing circuits, responsive to generating the vector embedding, a vector database having a plurality of vector embeddings to identify a set of vector embeddings of the plurality of vector embeddings that are associated with the vector embedding, each vector embedding of the set of vector embeddings corresponding to an entity of a plurality of entities;

identifying, by the one or more processing circuits, for each vector embedding of the set of vector embeddings, metadata that is linked to a corresponding vector embedding of the set of vector embeddings within the vector database;

selecting, by the one or more processing circuits, based on the metadata for each vector embedding of the set of vector embeddings, a first vector embedding of the set of vector embeddings that corresponds to the first entity, selecting the first vector embedding comprising determining that the first vector embedding corresponds to the first entity using the metadata for the first vector embedding;

generating, by the one or more processing circuits, an input based on the natural language query using context provided by the first vector embedding and the metadata for the first vector embedding;

generating, by the one or more processing circuits, by providing the input to a machine learning model, a response to the natural language query; and providing, by the one or more processing circuits, to the first computing device, an electronic message that includes the response to the natural language query.

14. The method of claim 13, wherein a second vector embedding of the set of vector embeddings corresponds to a given entity of the plurality of entities, and further comprising:

detecting, by the one or more processing circuits, responsive to identifying the set of vector embeddings, that a distance between the first vector embedding and the second vector embedding is less than a predetermined threshold;

searching, by the one or more processing circuits, responsive to detecting that the distance is less than the predetermined threshold, the vector database for (1) the metadata for the first vector embedding and (2) the metadata for the second vector embedding; and differentiating, by the one or more processing circuits, using the metadata for the first vector embedding and the metadata for the second vector embedding, the first entity from the given entity.

15. The method of claim 13, further comprising:

retrieving, by the one or more processing circuits, from a plurality of data sources, one or more sets of information associated with the plurality of entities;

generating, by the one or more processing circuits, responsive to retrieving the one or more sets of information, the plurality of vector embeddings; and ingesting, by the one or more processing circuits, the plurality of vector embeddings into the vector database.

16. The method of claim 13, wherein the first entity includes a first identifier and a second identifier, wherein the vector database includes information indicative of the first identifier, wherein the natural language query includes one or more first characters associated with the second identifier, and further comprising:

detecting, by the one or more processing circuits, responsive to identifying the one or more first characters, that the vector database includes second metadata to indicate a link between the second identifier and the first identifier;

modifying, by the one or more processing circuits, responsive to detecting the second metadata, the natural language query to replace the one or more first characters with one or more second characters associated with the first identifier; and generating, by the one or more processing circuits, using the natural language query including the one or more second characters, the vector embedding.

17. The method of claim 13, further comprising:

receiving, by the one or more processing circuits, from a second computing device, a data structure that includes a plurality of mappings between respective identifiers of a plurality of identifiers, each identifier of the plurality of identifiers associated with a respective entity of the plurality of entities, and a first mapping of the plurality of mappings to indicate that (1) a first identifier of the plurality of identifiers corresponds to the first entity and (2) one or more second identifiers of the plurality of identifiers represent the first identifier;

determining, by the one or more processing circuits, responsive to receiving the natural language query, that the natural language query includes the one or more second identifiers;

detecting, by the one or more processing circuits, based on the first mapping, that the one or more second identifiers represent the first identifier; and modifying, by the one or more processing circuits, the natural language query to replace the one or more second identifiers with the first identifier.

18. One or more non-transitory storage media storing instructions thereon that, when executed by one or more processors, cause the one or more processors to perform operations comprising:

receiving, from a first computing device, a natural language query for information associated with a first entity;

generating a vector embedding based on the natural language query;

searching, responsive to generating the vector embedding, a vector database having a plurality of vector embeddings to identify a set of vector embeddings of the plurality of vector embeddings that are associated with the vector embedding, each vector embedding of the set of vector embeddings corresponding to a respective entity of a plurality of entities;

identifying, for each vector embedding of the set of vector embeddings, metadata that is linked to a corresponding vector embedding of the set of vector embeddings within the vector database;

selecting, based on the metadata for each vector embedding of the set of vector embeddings, a first vector embedding of the set of vector embeddings that corresponds to the first entity, selecting the first vector embedding comprising determining that the first vector embedding corresponds to the first entity using the metadata for the first vector embedding;

generating a prompt based on the natural language query using context provided by the first vector embedding and the metadata for the first vector embedding;

generating, by providing the prompt to a large language model, a response to the natural language query; and providing, to the first computing device, an electronic message that includes the response to the natural language query.

19. The one or more non-transitory storage media of claim 18, wherein a second vector embedding of the set of vector embeddings corresponds to a given entity of the plurality of entities, and the operations further comprising:

detecting, responsive to identifying the set of vector embeddings, that a distance between the first vector embedding and the second vector embedding is less than a predetermined threshold;

searching, responsive to detecting that the distance is less than the predetermined threshold, the vector database for (1) the metadata for the first vector embedding and (2) the metadata for the second vector embedding; and differentiating, using the metadata for the first vector embedding and the metadata for the second vector embedding, the first entity from the given entity.

20. The one or more non-transitory storage media of claim 18, the operations further comprising:

retrieving, from a plurality of data sources, one or more sets of information associated with the plurality of entities;

generating, responsive to retrieving the one or more sets of information, the plurality of vector embeddings; and ingesting the plurality of vector embeddings into the vector database.

\* \* \* \* \*